US012771813B2

(12) United States Patent
Jeon et al.

(10) Patent No.: US 12,771,813 B2
(45) Date of Patent: Oct. 20, 2026

(54) ELECTRONIC APPARATUS INCLUDING SLIDING PROJECTOR AND METHOD FOR CONTROLLING THE SAME

(71) Applicant: SAMSUNG ELECTRONICS CO., LTD., Suwon-si (KR)

(72) Inventors: Jaehong Jeon, Suwon-si (KR); Giseok Sung, Suwon-si (KR); Sanghoon Eum, Suwon-si (KR); Gohwoon Jeong, Suwon-si (KR); Dosung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/941,680

(22) Filed: Nov. 8, 2024

(65) Prior Publication Data

US 2025/0071242 A1 Feb. 27, 2025

Related U.S. Application Data

(63) Continuation of application No. PCT/KR2023/003331, filed on Mar. 10, 2023.

(30) Foreign Application Priority Data

May 9, 2022 (KR) ........................ 10-2022-0056853
Aug. 29, 2022 (KR) ........................ 10-2022-0108678

(51) Int. Cl.
*H04N 9/31* (2006.01)

(52) U.S. Cl.
CPC ......... *H04N 9/3173* (2013.01); *H04N 9/3194* (2013.01)

(58) Field of Classification Search
CPC .. H04N 9/3173; H04N 9/3194; H04N 9/3147; H04N 9/3182; H04N 9/3141;
(Continued)

(56) References Cited

U.S. PATENT DOCUMENTS 10,015,435 B2 7/2018 Kim et al.
10,129,510 B2 11/2018 Ma
(Continued)

FOREIGN PATENT DOCUMENTS

CN 206389439 U 8/2017
EP 3203315 B1 * 8/2020 ............. G03B 21/00
(Continued)

OTHER PUBLICATIONS

International Search Report (PCT/ISA/210) issued on Jun. 23, 2023 by the International Searching Authority in International Patent Application No. PCT/KR2023/003331.
(Continued)

*Primary Examiner* — John W Miller
*Assistant Examiner* — Humam M Satti
(74) *Attorney, Agent, or Firm* — Sughrue Mion, PLLC

(57) ABSTRACT

An electronic apparatus including: a main body; a projecting part configured to retract in the main body and protrude from the main body to project an image; a memory storing at least one instruction; and at least one processor configured to execute the at least one instruction, where, by executing the at least one instruction, the at least one processor is configured to: obtain information about a projection plane, identify a protrusion distance of the projecting part corresponding to the projection plane based on the information about the projection plane, protrude the projecting part based on the protrusion distance, and control the projecting part to project the image on the projection plane.

15 Claims, 21 Drawing Sheets

(58) Field of Classification Search

CPC .. G03B 21/145; G03B 21/20; G03B 21/2046; G03B 17/54; G03B 5/02; F16M 11/06–14

See application file for complete search history.

(56) References Cited

U.S. PATENT DOCUMENTS

| | | | | |
|---|---|---|---|---|
| 10,250,857 | B2 | 4/2019 | Kim et al. | |
| 2008/0212039 | A1 | 9/2008 | Taylor | |
| 2009/0122271 | A1 | 5/2009 | Nagashima et al. | |
| 2011/0188008 | A1 | 8/2011 | Maeda et al. | |
| 2021/0247674 | A1 | 8/2021 | Shimizu et al. | |
| 2024/0045315 | A1 * | 2/2024 | Kim | G03B 21/142 |

FOREIGN PATENT DOCUMENTS

| | | | |
|---|---|---|---|
| JP | 2005-331585 | A | 12/2005 |
| JP | 2006-317559 | A | 11/2006 |
| JP | 2010-286699 | A | 12/2010 |
| KR | 10-2008-0079725 | A | 9/2008 |
| KR | 10-2012-0019289 | A | 3/2012 |
| KR | 20-2012-0003552 | U | 5/2012 |
| KR | 10-2013-0025073 | A | 3/2013 |
| KR | 10-1612196 | B1 | 4/2016 |
| KR | 10-2017-0067247 | A | 6/2017 |
| KR | 10-2393297 | B1 | 5/2022 |

OTHER PUBLICATIONS

Written Opinion (PCT/ISA/237) issued on Jun. 23, 2023 by the International Searching Authority in International Patent Application No. PCT/KR2023/003331.

Communication dated Jun. 13, 2025, issued by the European Patent Office in European Application No. 23803674.3.

Communication issued May 13, 2026 by the European Patent Office in European Patent Application No. 23803674.3.

* cited by examiner

ELECTRONIC APPARATUS INCLUDING SLIDING PROJECTOR AND METHOD FOR CONTROLLING THE SAME

CROSS-REFERENCE TO RELATED APPLICATION(S)

This application is a continuation of International Application No. PCT/KR2023/003331, filed on Mar. 10, 2023, in the Korean Intellectual Property Receiving Office, which is based on and claims priority to Korean Patent Applications No. 10-2022-0056853, filed on May 9, 2022 and No. 10-2022-0108678, filed on Aug. 29, 2022, in the Korean Intellectual Property Office, the disclosures of which are incorporated by reference herein in their entireties.

BACKGROUND

1. Field

The disclosure relates to an electronic apparatus and a method for controlling the same, and more particularly, to a sliding-projector electronic apparatus which projects an image by protruding or retracting a projecting part from or in a main body, and a method for controlling the same.

2. Description of Related Art

In a field of projector products, an ultra short throw image projecting part, which is different from a general long throw image projecting part, is a projector in which a distance between a screen and the projector is very close (e.g., within 50 cm).

SUMMARY

Aspects will be set forth in part in the description which follows and, in part, will be apparent from the description, or may be learned by practice of the presented embodiments.

According to an aspect of the disclosure, an electronic apparatus may include: a main body; a projecting part configured to retract in the main body and protrude from the main body to project an image; a memory storing at least one instruction; and at least one processor configured to execute the at least one instruction, where, by executing the at least one instruction, the at least one processor is configured to: obtain information about a projection plane, identify a protrusion distance of the projecting part that corresponds to the projection plane based on the information about the projection plane, protrude the projecting part based on the protrusion distance, and control the projecting part to project the image on the projection plane.

The information about the projection plane may include a size of the projection plane, where the at least one processor is further configured to: identify the protrusion distance of the projecting part as a first protrusion distance based on the size of the projection plane being a first size, and identify the protrusion distance of the projecting part as a second protrusion distance that is greater than the first protrusion distance based on the size of the projection plane being a second size that is larger than the first size.

The information about the projection plane may include a distance between the electronic apparatus and the projection plane, and where the at least one processor is further configured to: identify the protrusion distance of the projecting part as a first protrusion distance based on the distance between the electronic apparatus and the projection plane being a first distance, and identify the protrusion distance of the projecting part as a second protrusion distance that is less than the first protrusion distance based on the distance between the electronic apparatus and the projection plane being a second distance that is greater than the first distance.

The at least one processor may be further configured to: protrude the projecting part along a first path based on the protrusion distance of the projecting part being less than a predetermined distance, and protrude the projecting part along a second path based on the protrusion distance of the projecting part being at least the predetermined distance.

The first path may be a path along which the projecting part is moved in a direction parallel to ground on which the electronic apparatus is positioned, where the second path is a path along which the projecting part is moved in a vertical direction or diagonal direction from the ground on which the electronic apparatus is positioned.

The at least one processor may be further configured to identify the protrusion distance of the projecting part based on an operation mode of the electronic apparatus and the information about the projection plane.

The operation mode is one of: a first mode in which the projecting part is retracted in the main body, a second mode in which the projecting part is protruded by a first protrusion distance and displays information on a portion of the projection plane, and a third mode in which the projecting part is protruded by a second protrusion distance that is greater than the first protrusion distance and projects content on the projection plane.

The apparatus may further include a screen rotatable at the top of the main body, where the at least one processor is further configured to control the projecting part to: rotate the screen based on an operation mode of the electronic apparatus being a mode for projecting content on the projection plane, and project information on the screen while projecting the content on the projection plane.

The information about the projection plane may include a size of the projection plane and a distance between the electronic apparatus and the projection plane.

The at least one processor may be further configured to: identify a luminance value corresponding to the protrusion distance of the projecting part, and control the projecting part to project the image on the projection plane based on the identified luminance value.

The at least one processor may be further configured to protrude a projecting part included in a second electronic apparatus by a distance corresponding to an event, based on the event occurring while projecting the image on the projection plane in linkage with the second electronic apparatus.

The at least one processor may be further configured to control the projecting part to display a hologram at a top of the main body based on an operation mode of the electronic apparatus being a first mode in which the projecting part is retracted in the main body.

According to an aspect of the disclosure, a method for controlling an electronic apparatus may include: obtaining information about a projection plane; identifying a protrusion distance of a projecting part that corresponds to the projection plane based on the information about the projection plane; protruding the projecting part based on the protrusion distance of the projecting part; and controlling the projecting part to project an image on the projection plane.

The information about the projection plane may include a size of the projection plane, and the identifying of the protrusion distance of the projecting part may include:

identifying the protrusion distance of the projecting part as a first protrusion distance based on the size of the projection plane being a first size, and identifying the protrusion distance of the projecting part as a second protrusion distance that is greater than the first protrusion distance based on the size of the projection plane being a second size that is larger than the first size.

According to an aspect of the disclosure, provided is a non-transitory computer readable recording medium storing a program that executes a method for controlling an electronic apparatus, and the method may include: obtaining information about a projection plane; identifying a protrusion distance of a projecting part that corresponds to the projection plane based on the information about the projection plane; protruding the projecting part based on the protrusion distance of the projecting part; and controlling the projecting part to project an image on the projection plane.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
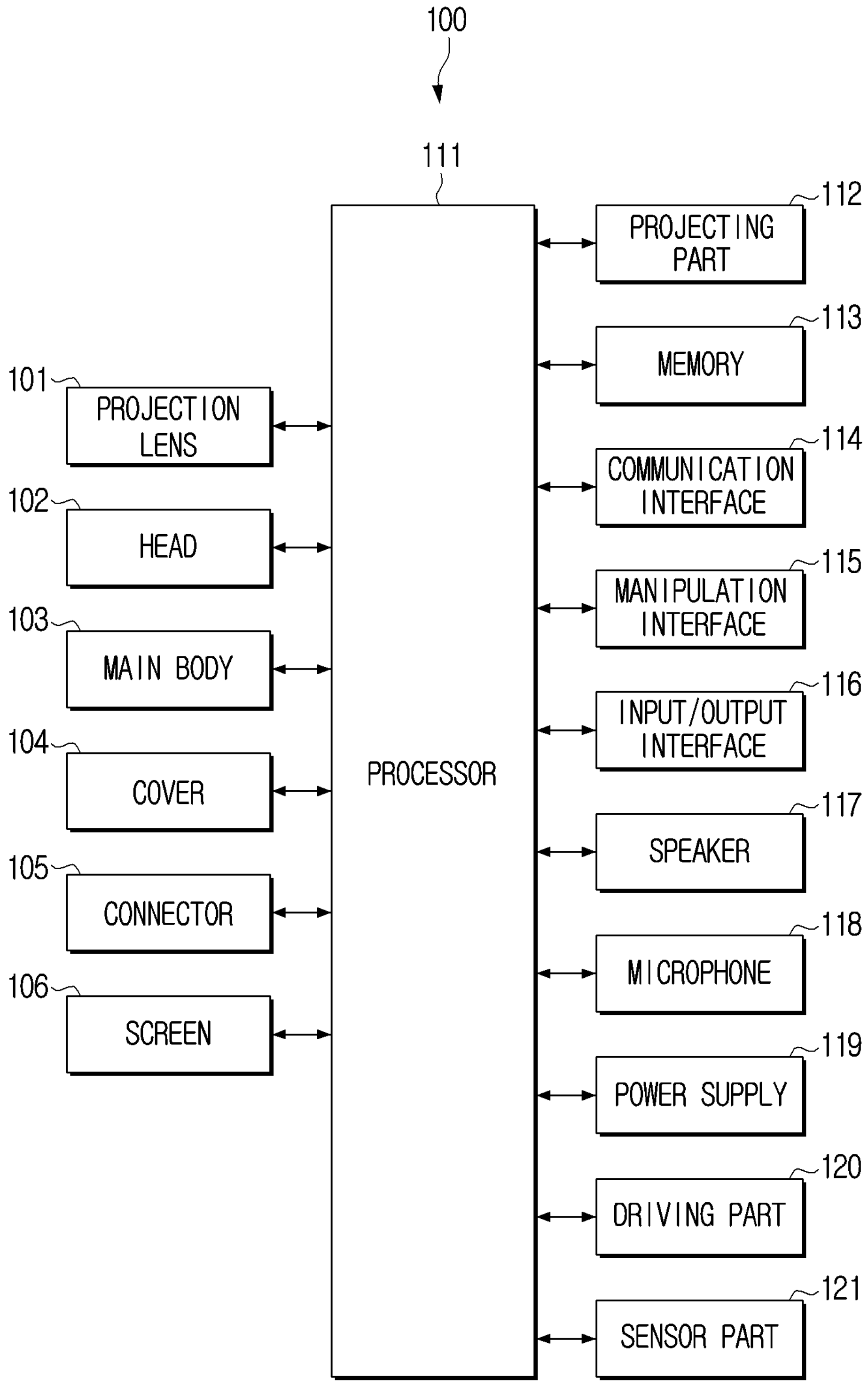
FIG. 1 is a block diagram for explaining a configuration of an electronic apparatus according to an embodiment of the disclosure.

The disclosure may be variously modified and have several embodiments, and specific embodiments of the disclosure are thus shown in the drawings and described in detail in the detailed description. However, it is to be understood that the scope of the disclosure is not limited to the specific embodiments, and includes various modifications, equivalents and/or alternatives according to the embodiments of the disclosure. Throughout the accompanying drawings, similar components are denoted by similar reference numerals and redundant descriptions are omitted.

In describing the disclosure, a detailed description is omitted where it is decided that a detailed description of the known functions or configurations related to the disclosure may unnecessarily obscure the gist of the disclosure.

In addition, the following embodiments may be modified in several different forms, and the scope and spirit of the disclosure are not limited to the following embodiments. Rather, these embodiments make the disclosure thorough and complete, and are provided to completely transfer the spirit of the disclosure to those skilled in the art.

Terms used in the disclosure are used only to describe the specific embodiments rather than limiting the scope of the disclosure. A term of a singular number may include its plural number unless explicitly indicated otherwise in the context.

In the disclosure, an expression "have", "may have", "include", "may include", "comprise", "may comprise", or the like, indicates existence of a corresponding feature (for example, a numerical value, a function, an operation, or a component such as a part), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B" or "at least one of A or B" may indicate all of 1) a case where at least one A is included, 2) a case where at least one B is included, or 3) a case where both of at least one A and at least one B are included.

Expressions "first", "second" and the like, used in the disclosure, may indicate various components regardless of the sequence and/or importance of the components. These expressions are used only to distinguish one component and another component from each other, and do not limit the corresponding components.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component).

On the other hand, in case that any component (for example, the first component) is mentioned to be "directly coupled to" or "directly connected to" another component (for example, the second component), it is to be understood that still another component (for example, the third component) is not present between any component and another component.

An expression "configured (or set) to" used in the disclosure may be replaced by an expression "suitable for", "having the capacity to", "designed to", "adapted to", "made to", or "capable of" based on a situation. The expression "configured (or set) to" may not necessarily indicate "specifically designed to" in hardware.

Instead, an expression "a device configured to" in any situation may indicate that the device may "perform~" together with another device or component. For example, "a processor configured (or set) to perform A, B and C" may indicate a dedicated processor (for example, an embedded processor) that may perform the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software or be implemented by a combination of hardware and software. In addition, a plurality of "modules" or a plurality of "~ers/ors" may be integrated with each other in at least one module and implemented by at least one processor except for a "module" or an "~er/or" that needs to be implemented in specific hardware.

Meanwhile, various elements and regions in the drawings are schematically shown. Therefore, the spirit of the disclosure is not limited by relative sizes or intervals shown in the accompanying drawings.

Hereinafter, the embodiments of the disclosure are described in detail with reference to the accompanying drawings so that those skilled in the art to which the disclosure pertains may easily practice the disclosure.

FIG. 1 is a block diagram showing overall configurations of an electronic apparatus according to an embodiment of the disclosure.

Referring to FIG. 1, the electronic apparatus 100 may include at least one of a projection lens 101, a head 102, a main body 103, a cover 104, a connector 105, a screen 106, a processor 111, a projecting part 112, a memory 113, a communication interface 114, a manipulation interface 115, an input/output interface 116, a speaker 117, a microphone 118, a power supply 119, a driving part 120, or a sensor part 121.

Meanwhile, the configuration shown in FIG. 1 is only one of various embodiments, from which some configurations may be omitted, and to which a new configuration may be added.

The electronic apparatus 100 may be devices in various forms. In particular, the electronic apparatus 100 may be a projector device that enlarges and projects an image to a wall or a screen, and the projector device may be a liquid crystal display (LCD) projector or a digital light processing (DLP) type projector that uses a digital micromirror device (DMD).

In addition, the electronic apparatus 100 may be a home or industrial display device, an illumination device used in daily life, or an audio device including an audio module. The electronic apparatus 100 may be implemented as a portable communication device (e.g., smartphone), a computer device, a portable multimedia device, a wearable device, a home appliance device, or the like. The electronic apparatus 100 according to an embodiment of the disclosure is not limited to the above-described device and may be implemented as an electronic apparatus 100 having two or more functions of the above-described devices. For example, the electronic apparatus 100 may be used as the display device, the illumination device or the audio device while its projector function is turned off and its illumination function or a speaker function is turned on based on a manipulation of the processor or may be used as an artificial intelligence (AI) speaker including a microphone or a communication device.

The projection lens 101 may be disposed on one surface of the projecting part 112 or the main body 103, and project light that passed through a lens array outside the main body 103. The projection lens 101 according to the various embodiments may be an optical lens low-dispersion coated for reducing chromatic aberration. The projection lens 101 may be a convex lens or a condensing lens, and the projection lens 101 according to the various embodiments may adjust a focus by adjusting positions of a plurality of sub-lenses.

The head 102 may be coupled to one surface of the main body 103 to thus support and protect the projection lens 101. The head 102 may be coupled to the main body 103 to be swiveled within a predetermined angle range based on one surface of the main body 103.

The head 102 may be automatically or manually swiveled by a user or the processor to thus freely adjust a projection angle of the projection lens 101. Alternatively, the head 102 may include a neck coupled to and extending from the main body 103, and thus be tilted backward or forward, thereby adjusting the projection angle of the projection lens 101.

Figure 2A:
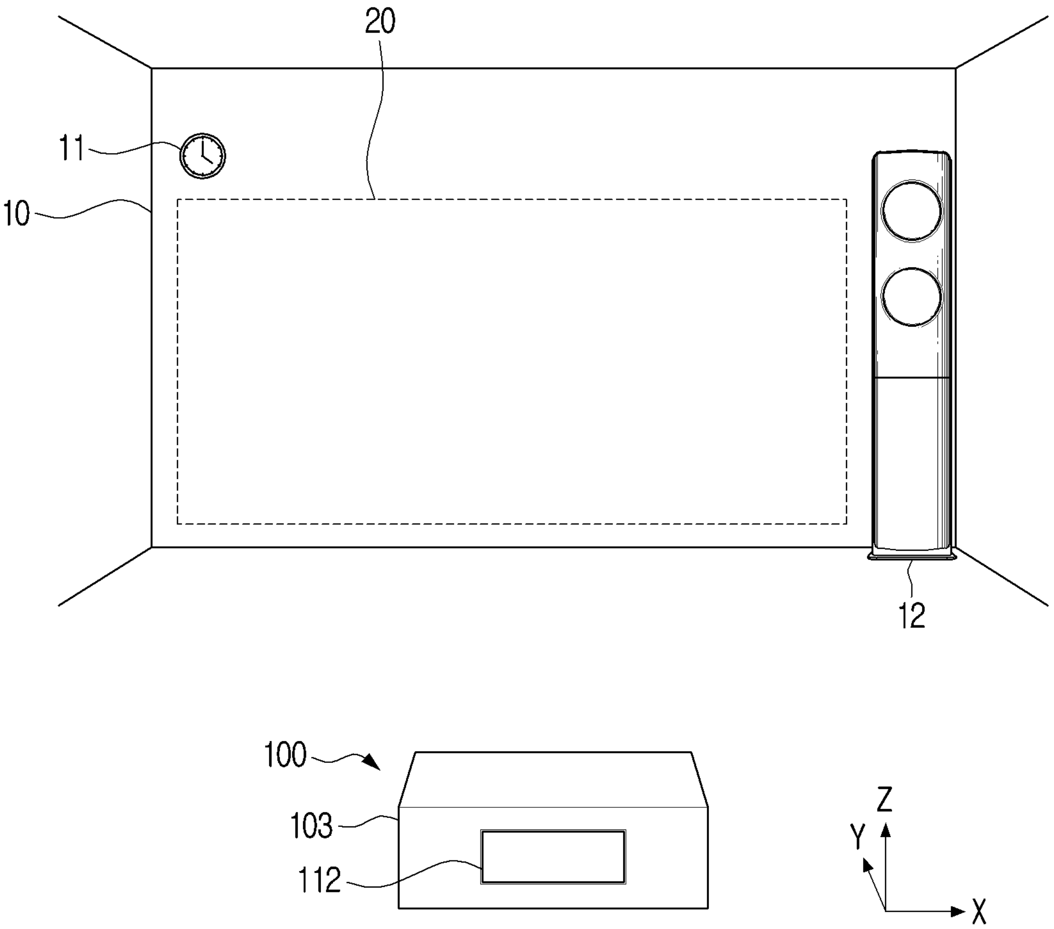
FIG. 2A and FIG. 2B are diagrams for explaining an operation of the electronic apparatus according to an embodiment of the disclosure.
Figure 2B:
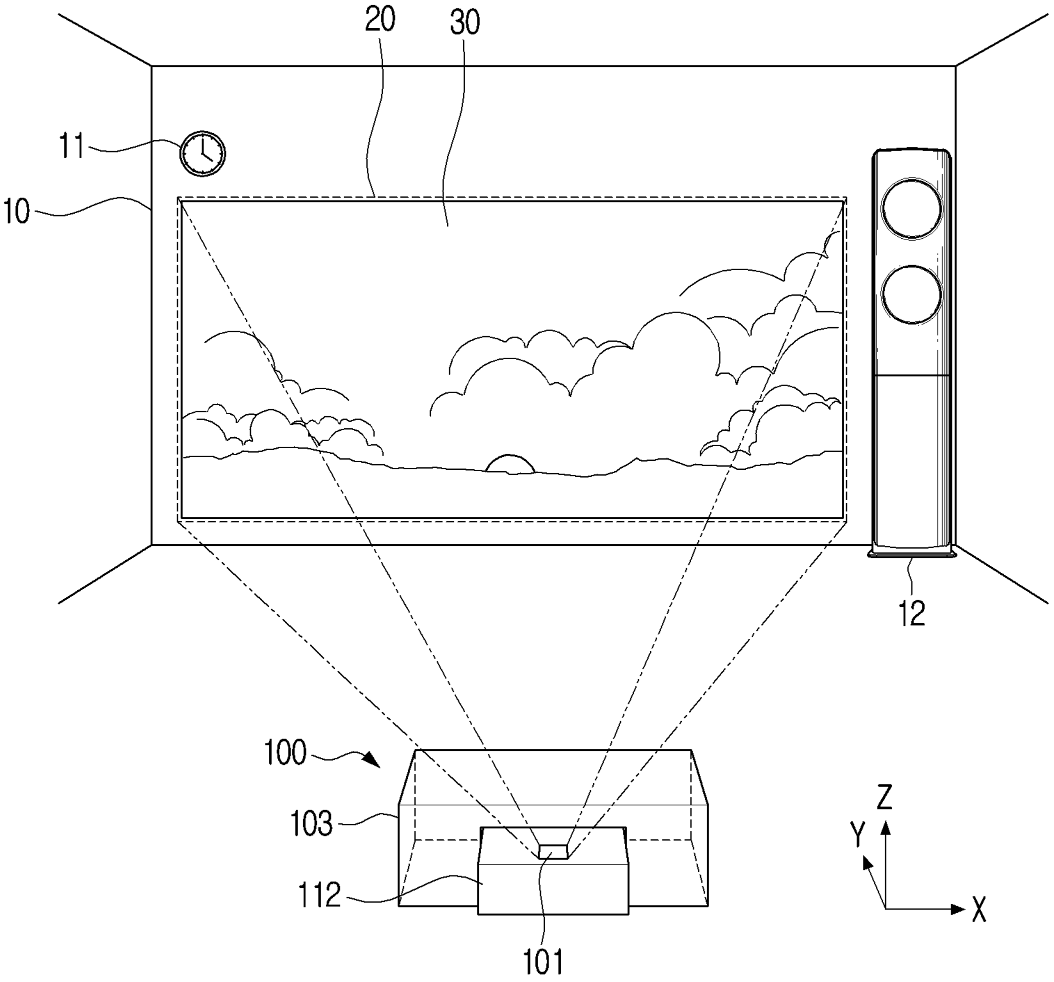

The main body 103 is a housing that forms an exterior, and may support or protect the components of the electronic apparatus 100, which are disposed in the main body 103. The main body 103 may have a rectangular parallelepiped shape as shown in FIGS. 2A and 2B. However, the main body 103 is not limited to this shape, and according to the various embodiments of the disclosure, the main body 103 may be implemented in various geometrical shapes such as a nearly cylindrical shape, a column having polygonal cross sections, a cone, and a sphere.

The main body 103 may have a size enabling the main body to be gripped or moved by a user with his/her one hand or may be implemented in a micro size enabling the main body to be easily carried by the user or a size enabling the main body to be held on a table or coupled to the illumination device.

A material of the main body 103 may be matt metallic or synthetic resin for the user's fingerprint or dust not to smear the main body. Alternatively, the exterior of the main body 103 may be made of a slick glossy material.

The main body 103 may have a friction area formed in a partial area of the exterior of the main body 103 for the user to grip and move the main body 103. Alternatively, the main body 103 may have a bent gripping part or a support positioned in at least a partial area for the user to grip the corresponding part.

The electronic apparatus 100 may project light or the image to a desired position by adjusting a projection angle of the projection lens 101 while adjusting a direction of the head 102 in a state where the position and angle of the main body 103 are fixed. In addition, the head 102 may include a handle that the user may grip after rotating the head in a desired direction.

A plurality of openings may be formed in an outer peripheral surface of the main body 103. Through the plurality of openings, audio output from an audio outputter may be output to outside the main body 103 of the electronic apparatus 100. The audio outputter may include a speaker 117, and the speaker 117 may be used for general uses such as reproduction of multimedia or reproduction of recording, and output of a voice.

According to an embodiment of the disclosure, the main body 103 may include a heat dissipation fan provided therein, and in case that the heat dissipation fan is operated, air or heat in the main body 103 may be discharged through the plurality of openings. Accordingly, the electronic apparatus 100 may discharge heat occurring due to the driving of the electronic apparatus 100 to the outside and prevent overheating of the electronic apparatus 100.

The connector 105 may connect the electronic apparatus 100 with an external device to transmit or receive electronic signals or receive power from the external device. The connector 105 according to an embodiment of the disclosure may be physically connected with the external device. The connector 105 may include an input/output interface to connect its communication with the external device in a wired or wireless manner or receive the power from the external device. For example, the connector 105 may include a high-definition multimedia interface (HDMI) connection terminal, a universal serial bus (USB) connection terminal, a secure digital (SD) card accommodating groove, an audio connection terminal, or a power consent. Alternatively, the connector 105 may include a Bluetooth, wireless-fidelity (Wi-Fi) or wireless charge connection module, connected with the external device in the wireless manner.

In addition, the connector 105 may have a socket structure connected to an external illumination device and may be connected to a socket accommodating groove of the external illumination device to receive the power. The size and specification of the connector 105 having the socket structure may be implemented in various ways in consideration of an accommodating structure of the external device that may be coupled thereto. For example, a diameter of a joining portion of the connector 105 may be 26 mm according to an international standard E26, and in this case, the electronic apparatus 100 may be coupled to the external illumination device such as a stand in place of a light bulb that is generally used. When being coupled to a conventional socket positioned on a ceiling, the electronic apparatus 100 may perform the projection top to bottom (vertically). Accordingly, by socket coupling, the electronic apparatus 100 cannot be rotated, and in this case, the screen cannot be rotated either. Accordingly, the electronic apparatus 100 may project or rotate the screen to the desired position while being socket-coupled to a stand on the ceiling by allowing the head 102 to swivel on one surface of the main body 103 to have an adjusted projection angle for the electronic apparatus 100 to be rotated even when being socket-coupled and receiving power.

The connector 105 may include a coupling sensor, and the coupling sensor may detect whether the connector 105 is coupled to the external device, its coupling state, or its coupling target, and transmit the same to the processor, and the processor may control the driving of the electronic apparatus 100 based on a received detection value.

The cover 107 may be coupled to or separated from the main body 103 and protect the connector 105 for the connector 105 not to be always exposed to the outside. The cover 107 may have a shape continued from the shape of the main body 103 as illustrated in FIG. 1 or a shape corresponding to the shape of the connector 105. The cover 107 may support the electronic apparatus 100, and the electronic apparatus 100 may be used by being coupled to or held on an external holder while being coupled to the cover 107.

In the electronic apparatus 100 according to the various embodiments of the disclosure, a battery may be positioned inside the cover 107. The battery may include, for example, a primary cell that cannot be recharged, a secondary cell that may be recharged, or a fuel cell.

The screen 106 may be a component that projects the image by the projecting part 112. The screen 106 may be retracted in the main body 103 or coupled to one side (for example, the top) of the main body 103. Here, the screen 106 may be a rollable screen that may protrude outside the main body 103 by the driving part 120 while being retracted in the main body 103. Alternatively, the screen 106 may be rotated 90 degrees by the driving part 120 while a projection plane of the screen 106 is in contact with one side (e.g., the top) of the main body 103. In addition, in case that the screen 106 protrudes outside the main body 103 or is rotated by 90 degrees, the image may be projected by the projecting part 112.

Though it is not described in the drawings, the electronic apparatus 100 may include a camera module, and the camera module may capture a still image or a video. According to various embodiments of the disclosure, the camera module may include at least one lens, an image sensor, an image signal processor, or a flash.

Though it is not described in the drawings, the electronic apparatus 100 may include a protection case for the electronic apparatus 100 to be easily carried while being protected. Alternatively, the electronic apparatus 100 may include a stand that supports or fixes the main body 103, or a bracket that may be coupled to a wall surface or a partition.

In addition, the electronic apparatus 100 may be connected with the various external devices by using its socket structure, and provide various functions. According to various embodiments of the disclosure, the electronic apparatus 100 may be connected to an external camera device by using the socket structure. The electronic apparatus 100 may provide an image stored in the connected camera device or an image that is currently being captured using a projecting part 112. In another embodiment of the disclosure, the electronic apparatus 100 may be connected to a battery module by using the socket structure to receive power. The electronic apparatus 100 may be connected to the external device by using the socket structure, which is merely an example, and may be connected to the external device by using another interface (e.g., USB).

The processor 111 may control overall operations of the electronic apparatus 100. The processor 111 may control overall operations of the electronic apparatus 100.

The processor 111 may be implemented as a digital signal processor (DSP), a microprocessor, or a time controller (TCON). However, the processor 111 is not limited thereto, and may include at least one of a central processing unit (CPU), a micro controller unit (MCU), a micro processing unit (MPU), a controller, an application processor (AP), a graphics-processing unit (GPU), a communication processor (CP), or an advanced reduced instruction set computer (RISC) machine (ARM) processor, or may be defined by these terms. In addition, the processor 111 may be implemented as a system-on-chip (SoC) or a large scale integration (LSI), in which a processing algorithm is embedded, or may be implemented in the form of a field programmable gate array (FPGA). In addition, the processor 111 may perform various functions by executing computer executable instructions stored in the memory 113.

The projecting part 112 may be a component that projects the image to the outside. The projecting part 112 according to an embodiment of the disclosure may be implemented in various projection types (e.g., cathode-ray tube (CRT) type, liquid crystal display (LCD) type, digital light processing (DLP) type, or laser type). As an example, the CRT type has basically the same principle as the principle of a CRT monitor. The CRT type may display the image on the screen by enlarging the image by using a lens in front of a cathode-ray tube (CRT). The CRT type may be divided into a one-tube type and a three-tube type based on the number of cathode-ray tubes, and in the three-tube type, the cathode-ray tubes of red, green, and blue are separated from one another.

For an example, the LCD type may display the image by allowing light emitted from a light source to pass through a liquid crystal. The LCD type may be divided into a single-panel type and a three-panel type. When the three-plate type, the light emitted from the light source may be separated into red, green and blue in a dichroic mirror (which is a mirror that reflects only light of a specific color and allows the rest to pass therethrough), may then pass through the liquid crystal, and may then be collected into one place again.

For still an example, the DLP type may display the image by using a digital micromirror device (DMD) chip. The DLP type projecting part may include a light source, a color wheel, the DMD chip, a projection lens, etc. Light emitted from the light source may be colored as passing through a rotating color wheel. Light passed through the color wheel may be input into the DMD chip. The DMD chip may include numerous micromirrors and reflect light input to the DMD chip. The projection lens may expend light reflected from the DMD chip to the image size.

For yet an example, the laser type may include a diode pumped solid state (DPSS) laser and a galvanometer. The laser type that outputs various colors may use a laser in which three DPSS lasers are respectively installed for red, green, and blue (RGB) colors, and their optical axes overlap each other by using a special mirror. The galvanometer may include a mirror and a high-power motor and move the mirror at a high speed. For example, the galvanometer may rotate the mirror at up to 40 KHz/sec. The galvanometer may be mounted in a scanning direction, and in general, a projector performs planar scanning, and the galvanometer may thus also be disposed by being divided into x and y axes.

The projecting part 112 may include light sources of various types. For example, the projecting part 112 may include at least one light source of a lamp, a light emitting diode (LED), and a laser.

The projecting part 112 may output the image in a screen ratio of 4:3, a screen ratio of 5:4, and a wide screen ratio of 16:9, based on a purpose of the electronic apparatus 100, the user's setting or the like, and may output the image having various resolutions such as wide video graphics array WVGA (854*480 pixels), super video graphics array SVGA (800*600 pixels), extended graphics array XGA (1024*768 pixels), wide extended graphics array WXGA (1280*720 pixels), WXGA (1280*800 pixels), super extended graphics array SXGA (1280*1024 pixels), ultra extended graphics array UXGA (1600*1200 pixels) and full high-definition HD (1920*1080 pixels), based on the screen ratio.

The projecting part 112 may perform various functions for adjusting the output image under the control of the processor 111. For example, the projecting part 112 may perform a zoom function, the keystone function, a quick corner (or four corner) keystone function and a lens shift function, or the like.

The projecting part 112 may enlarge or reduce the image based its distance (i.e., projection distance) to the screen. That is, the projecting part 112 may perform the zoom function based on its distance to the screen. The zoom function may include a hardware method of adjusting a screen size by moving a lens, and a software method of adjusting the screen size by cropping the image, or the like. In case that the zoom function is performed, it is necessary to adjust a focus of the image. For example, a method of adjusting the focus may include a manual focusing method, an electric focusing method, etc. The manual focusing method may indicate a method of manually adjusting the focus, and the electric focusing method may indicate a method in which the projector automatically adjusts the focus by using a motor built therein when performing the zoom function. When performing the zoom function, the projecting part 112 may provide a digital zoom function through software or may provide an optical zoom function in which the zoom function is performed by moving the lens by using a driving part 120.

In addition, the projecting part 112 may perform the keystone correction function. When a height is not correct for a front projection, the screen may be distorted up or down. The keystone correction function may be a function of correcting a distorted screen. For example, in case that the distortion occurs on the screen in a horizontal direction, the distortion may be corrected using a horizontal keystone, and in case that the distortion occurs on the screen in a vertical direction, the distortion may be corrected using a vertical keystone. The quick corner (or four corner) keystone correction function may be a function of correcting the screen in case that a balance between corner areas of the screen is not appropriate while a central area of the screen is normal. The lens shift function may be a function of moving the screen as it is in case that the screen is outside a screen area.

The projecting part 112 may provide the zoom/keystone/focusing functions by automatically analyzing a surrounding environment and a projection environment without the user input. The projecting part 112 may automatically provide the zoom/keystone/focusing functions, based on the distance between an electronic apparatus 100 and the screen, information about a space where the electronic apparatus 100 is currently positioned, information about an amount of ambient light, or the like, detected by the sensor (e.g., depth camera, distance sensor, infrared sensor, or illumination sensor).

In addition, the projecting part 112 may provide an illumination function by using the light source. In particular, the projecting part 112 may provide the illumination function by outputting the light source by using the LED. In various embodiments, the projecting part 112 may include one LED, and in various embodiments, the electronic apparatus 100 may include the plurality of LEDs. The projecting part 112 may output the light source by using a surface-emitting LED in an implementation example. The surface-emitting LED may be an LED in which an optical sheet is disposed on an upper side of the LED for the light source to be evenly dispersed and output. When the light source being output through the LED, the light source may be evenly dispersed through the optical sheet, and the light source dispersed through the optical sheet may be introduced into a display panel.

The projecting part 112 may provide the user with a dimming function for adjusting intensity of the light source. The projecting part 112 may control the LED to output the intensity of the light source that corresponds to a received user input when receiving the user input for adjusting the intensity of the light source from the user through the manipulation interface 115 (e.g., touch display button or dial).

In addition, the projecting part 112 may provide the dimming function, based on the content analyzed by the processor 111 without the user input. The projecting part 112 may control the LED to output the intensity of the light source, based on information (e.g., content type or content brightness) on the currently-provided content.

The projecting part 112 may control a color temperature by the control of the processor 111. The processor 111 may control a color temperature based on the content. In case that it is identified that the content is to be output, the processor 111 may obtain color information for each frame of the content whose output is determined. The processor 111 may then control the color temperature based on the obtained color information for each frame. The processor 111 may obtain at least one main color of the frame based on the color information for each frame. The processor 111 may then adjust the color temperature based on the obtained at least one main color. For example, the color temperature that the processor 111 may adjust may be divided into a warm type or a cold type. The frame to be output (hereinafter, output frame) may include a fire scene. The processor 111 may identify (or obtain) that the main color is red based on the color information included in the current output frame. The processor 111 may then identify the color temperature corresponding to the identified main color (red). The color temperature corresponding to the red color may be the warm type. The processor 111 may use an artificial intelligence model to obtain the color information or main color of the frame. According to an embodiment of the disclosure, the artificial intelligence model may be stored in the electronic apparatus 100 (e.g., memory 113). According to an embodiment of the disclosure, the artificial intelligence model may be stored in an external server capable to communicate with the electronic apparatus 100.

Meanwhile, the projecting part 112 may be in a first state where the entire projecting part 112 is retracted in the main body 103. In addition, the projecting part 112 may be in a second state where at least a portion of the projecting part 112 protrudes from the main body 103 and exposed outside the main body 103.

As shown in FIG. 2A, in case that the projecting part 112 is in the first state, the projecting part 112 may not be exposed outside the main body 103, and light emitted from the projecting part 112 may not be emitted outside the main body 103 (e.g., to a wall 10 or a projection plane 20). Here, the processor 111 may identify the projection plane 20 by sensing the wall or the screen using the sensor part 121. In addition, the processor 111 may obtain information on the identified projection plane.

In addition, as shown in FIG. 2B, the processor 111 may protrude at least a portion of the projecting part 112 from the main body 103. In addition, the processor 111 may control the projecting part 112 to project the image on the projection plane 20 in case that at least a portion of the projecting part 112 protrudes. Here, in case that a portion of the projecting part 112 protrudes from the main body 103, a portion of light emitted from the projecting part 112 may be shielded by the main body 103. In addition, light emitted from the projecting part 112 that is shielded by the main body 103 may be reduced as the protrusion distance of the projecting part 112 is increased.

The memory 113 may be implemented as an internal memory such as a read-only memory (ROM, e.g., electrically erasable programmable read-only memory (EEPROM)) or a random access memory (RAM), included in the processor 111, or as a memory separate from the processor 111. In this case, the memory 113 may be implemented in the form of a memory embedded in the electronic apparatus 100 or in the form of a memory detachable from the electronic apparatus 100, based on a data storage purpose. For example, data for driving the electronic apparatus 100 may be stored in the memory embedded in the electronic apparatus 100, and data for an extension function of the electronic apparatus 100 may be stored in the memory detachable from the electronic apparatus 100.

Meanwhile, the memory embedded in the electronic apparatus 100 may be implemented as at least one of a volatile memory (e.g., dynamic RAM (DRAM), static RAM (SRAM), or synchronous dynamic RAM (SDRAM)) or a non-volatile memory (e.g., one time programmable ROM (OTPROM), programmable ROM (PROM), erasable and programmable ROM (EPROM), electrically erasable and programmable ROM (EEPROM)), mask ROM, flash ROM, flash memory (e.g., NAND flash or NOR flash), hard drive, or solid state drive (SSD)); and the memory detachable from the electronic apparatus 100 may be implemented as a memory card (e.g., compact flash (CF), secure digital (SD), micro secure digital (Micro-SD), mini secure digital (mini-SD), extreme digital (xD), or multi-media card (MMC)), an external memory (e.g., USB memory) which may be connected to a universal serial bus (USB) port, or the like.

The memory 113 may store at least one instruction on the electronic apparatus 100. In addition, the memory 113 may store an operating system (O/S) for driving the electronic apparatus 100. The memory 113 may also store various software programs or applications for operating the electronic apparatus 100 in various examples of the disclosure. Further, the memory 113 may include a semiconductor memory such as a flash memory, or a magnetic storing medium such as a hard disk.

The memory 113 may store various software modules for operating the electronic apparatus 100 in the various examples of the disclosure, and the processor 111 may control the operation of the electronic apparatus 100 by executing the various software modules stored in the memory 113. That is, the memory 113 may be accessed by the processor 111, and the processor 111 may perform readout, recording, correction, deletion, update and the like of data in the memory 113.

In the disclosure, the term "memory 113" may include the memory 113, a read only memory (ROM) or a random access memory (RAM) in the processor 111, or a memory card (for example, a micro secure digital (SD) card or a memory stick) mounted in the electronic apparatus 100.

The communication interface 114 may be a component that communicates with the various types of external devices by using various types of communication methods. The communication interface 114 may include a wireless communication module or a wired communication module. Here, each communication module may be implemented in the form of at least one hardware chip.

The wireless communication module may be a module that communicates with the external device in the wireless manner. For example, the wireless communication module may include at least one of the wireless-fidelity (Wi-Fi) module, the Bluetooth module, an infrared communication module, or other communication modules.

The Wi-Fi module and the Bluetooth module may respectively perform the communication in a Wi-Fi manner and a Bluetooth manner. In case of using the Wi-Fi module or the Bluetooth module, the communication interface may first transmit and receive various connection information such as a service set identifier (SSID) or a session key, connect the communication by using this connection information, and then transmit and receive various information.

The infrared communication module may perform the communication based on infrared data association (IrDA) technology that transmits data in a short distance in the wireless manner by using an infrared ray between visible and millimeter waves.

In addition to the above-described communication manners, other communication modules may include at least one communication chip performing the communication based on various wireless communication standards such as zigbee, third generation (3G), third generation partnership project (3GPP), long term evolution (LTE), LTE advanced (LTE-A), fourth generation (4G), and fifth generation (5G).

The wired communication module may be a module that communicates with the external device in the wired manner. For example, the wired communication module may include at least one of a local area network (LAN) module, an Ethernet module, a pair cable, a coaxial cable, an optical fiber cable, or an ultra wide-band (UWB) module.

The manipulation interface 115 may include various types of input devices. For example, the manipulation interface 115 may include a physical button. The physical button may include a function key, a direction key (e.g., a four-direction key), or a dial button. In an example, the physical button may be implemented as a plurality of keys. In an example, the physical button may be implemented as one key. In case that the physical button is implemented as one key, the electronic apparatus 100 may receive the user input in which the one key is pressed for a critical time or longer. When receiving the user input in which one key is pressed for the critical time or longer, the processor 111 may perform a function corresponding to the user input. For example, the processor 111 may provide the illumination function based on the user input.

In addition, the manipulation interface 115 may receive the user input by using a non-contact method. In the case of receiving the user input by using a contact method, a physical force may be required to be transmitted to the electronic apparatus. There may thus be a need for a method of controlling the electronic apparatus regardless of the physical force. The manipulation interface 115 may receive a user gesture and may perform an operation corresponding to the received user gesture. The manipulation interface 115 may receive the user gesture through the sensor (e.g., image sensor or infrared sensor).

In addition, the manipulation interface 115 may receive the user input by using a touch method. For example, the manipulation interface 115 may receive the user input through a touch sensor. In an example, the touch method may be implemented as the non-contact method. For example, the touch sensor may determine whether a user body approaches within a critical distance. The touch sensor may identify the user input even in case that the user does not touch the touch sensor. In an example, the touch sensor may identify the user input in which the user touches the touch sensor.

The electronic apparatus 100 may receive the user input in various ways other than the manipulation interface described above. In an example, the electronic apparatus 100 may receive the user input from an external remote control device. The external remote control device may be a remote control device corresponding to the electronic apparatus 100 (e.g., control device dedicated to the electronic apparatus) or the portable communication device (e.g., smartphone or wearable device) of the user. The portable communication device of the user may store an application for controlling the electronic apparatus. The portable communication device may obtain the user input from the application stored therein, and transmit the obtained user input to the electronic apparatus 100. The electronic apparatus 100 may receive the user input from the portable communication device, and perform an operation corresponding to the user's control command The electronic apparatus 100 may receive the user input by using voice recognition. In an embodiment of the disclosure, the electronic apparatus 100 may receive a user voice through the microphone included in the electronic apparatus 100. In an embodiment of the disclosure, the electronic apparatus 100 may receive the user voice from the microphone or the external device. The external device may obtain the user voice through the microphone of the external device, and transmit the obtained user voice to the electronic apparatus 100. The user voice transmitted from the external device may be audio data or digital data converted from the audio data (e.g., audio data converted to a frequency domain). The electronic apparatus 100 may perform an operation corresponding to the received user voice. The electronic apparatus 100 may receive the audio data corresponding to the user voice through the microphone. The electronic apparatus 100 may then convert the received audio data to the digital data. The electronic apparatus 100 may then convert the converted digital data to text data by using a speech-to-text (STT) function. In an embodiment of the disclosure, the speech-to-text (STT) function may be directly performed by the electronic apparatus 100.

In another embodiment, the speech-to-text (STT) function may be performed by the external server. The electronic apparatus 100 may transmit the digital data to the external server. The external server may convert the digital data to the text data, and obtain control command data based on the converted text data. The external server may transmit the control command data (which may here also include the text data) to the electronic apparatus 100. The electronic apparatus 100 may perform an operation corresponding to the user voice based on the obtained control command data.

The electronic apparatus 100 may provide a voice recognition function by using one assistance (or an artificial intelligence agent such as Bixby™), which is only an example, and the electronic apparatus 100 may provide the voice recognition function by using a plurality of assistances. The electronic apparatus 100 may provide the voice recognition function by selecting one of the plurality of assistances based on a trigger word corresponding to the assistance or a specific key included in a remote controller.

The electronic apparatus 100 may receive the user input by using a screen interaction. The screen interaction may indicate a function in which the electronic apparatus identifies whether a predetermined event is generated through the image projected to the screen (or projection plane), and obtains the user input based on the predetermined event. The predetermined event may be an event in which a predetermined object is identified at a specific position (e.g., position to which the UI for receiving the user input is projected). The predetermined object may include at least one of a user body part (e.g., finger), a pointer, or a laser point. The electronic apparatus 100 may identify that the electronic apparatus 100 receives the user input for selecting the projected UI in case that it is identified that the predetermined object exists at the position corresponding to the projected UI. For example, the electronic apparatus 100 may project a guide image displaying the UI on the screen. The electronic apparatus 100 may then identify whether the user selects the projected UI. The electronic apparatus 100 may identify that the user selects the projected UI in case that the predetermined event is identified at the position of the projected UI. The projected UI may include at least one item. The electronic apparatus 100 may perform spatial analysis to identify whether the predetermined event exists at the position of the projected UI. The electronic apparatus 100 may perform the spatial analysis through the sensor (e.g., image sensor, infrared sensor, depth camera, or distance sensor). The electronic apparatus 100 may identify whether the predetermined event is generated at the specific position (i.e., position to which the UI is projected) by performing the spatial analysis. In addition, in case that it is identified that the predetermined event is generated at the specific position (i.e., position to which the UI is projected), the electronic apparatus 100 may identify that the electronic apparatus 100 receives the user input for selecting the UI corresponding to the specific position.

The input/output interface 116 is a component for inputting or outputting at least one of an audio signal or an image signal. The input/output interface 116 may receive at least one of the audio signal or the image signal from the external device, and output the control command to the external device.

According to an implementation example, the input/output interface 116 may be implemented as an interface inputting and outputting only the audio signal, an interface inputting and outputting only the image signal, or one interface for inputting and outputting both the audio signal and the image signal.

The input/output interface 116 according to an embodiment of the disclosure may be implemented as a wired input/output interface of at least one of a high definition multimedia interface (HDMI), a mobile high-definition link (MHL), a universal serial bus (USB), a USB C-type, a display port (DP), a thunderbolt, a video graphics array (VGA) port, a red-green-blue (RGB) port, a D-subminiature (D-SUB) or a digital visual interface (DVI). In an example, the wired input/output interface may be implemented as an interface inputting or outputting only the audio signal and an interface inputting or outputting only the image signal, or implemented as one interface inputting or outputting both the audio signal and the image signal.

In addition, the electronic apparatus 100 may receive the data through the wired input/output interface, which is only an embodiment of the disclosure, and the electronic apparatus 100 may receive power through the wired input/output interface. For example, the electronic apparatus 100 may receive power from an external battery through the USB C-type, or receive power from an outlet through a power adapter. For an example, the electronic apparatus may receive power from the external device (e.g., laptop computer or monitor) through the display port (DP).

In addition, the audio signal may be input through the wired input/output interface, and the image signal may be input through a wireless input/output interface (or communication interface). Alternatively, the audio signal may be input through the wireless input/output interface (or communication interface), and the image signal may be input through the wired input/output interface.

The speaker 117 is a component that outputs the audio signal. In particular, the speaker 117 may include an audio output mixer, an audio signal processor, and an audio output module. The audio output mixer may mix the plurality of audio signals to be output as at least one audio signal. For example, the audio output mixer may mix an analog audio signal and another analog audio signal (e.g., analog audio signal received from the outside) as at least one analog audio signal. The audio output module may include the speaker or an output terminal. According to an embodiment, the audio output module may include the plurality of speakers. In this case, the audio output module may be disposed in the main body, and audio emitted while covering at least a portion of a diaphragm of the audio output module may pass through a waveguide to be transmitted to the outside the main body. The audio output module may include a plurality of audio output units, and the plurality of audio output units may be symmetrically arranged on the exterior of the main body, and accordingly, the audio may be emitted to all directions, i.e., all directions in 360 degrees.

The microphone 118 may be a component that receives the user voice or other sounds and converts the same to the audio data. The microphone 118 may receive the user voice while activated. For example, the microphone 118 may be integrated into the upper, front, or side part of the electronic apparatus 100. The microphone 118 may include various components such as a microphone collecting the user voice in an analog form, an amplifier circuit amplifying the collected user voice, an analog to digital (A/D) conversion circuit sampling the amplified user voice and converting the same to a digital signal, a filter circuit removing a noise component from the converted digital signal, and the like.

The power supply 119 may receive power from the outside and supply power to the various components of the electronic apparatus 100. The power supply 119 according to an embodiment of the disclosure may receive power in various ways. In an example, the power supply 119 may receive power by using the connector 105 as illustrated in FIG. 1. In addition, the electronic apparatus may receive power by using a direct current (DC) power cord of 220V. However, the disclosure is not limited thereto, and the power supply 119 may receive power by using a USB power cord, or may receive power by using a wireless charging method.

In addition, the power supply 119 may receive power by using an internal battery or the external battery. The power supply 119 according to an embodiment of the disclosure may receive power through the internal battery. For example, the power supply 119 may charge power of the internal battery by using at least one of the DC power cord of 220V, the USB power cord, or a USB C-Type power cord, and may receive power through the charged internal battery. In addition, the power supply 119 according to an embodiment of the disclosure may receive power through the external battery. For example, the power supply 119 may receive power through the external battery in case that the electronic apparatus and the external battery is connected through various wired communication methods such as the USB power code, the USB C-type power code, or a socket groove. That is, the power supply 119 may directly receive power from the external battery, or charge the internal battery through the external battery and receive power from the charged internal battery.

The power supply 119 according to the disclosure may receive power by using at least one of the aforementioned plurality of power supply methods.

With respect to power consumption, the electronic apparatus 100 may have the power consumption of a predetermined value (e.g., 43 W) or less due to a socket type, another standard, etc. The electronic apparatus 100 may change power consumption to reduce the power consumption when using the battery. That is, the electronic apparatus 100 may change the power consumption based on the power supply method, power usage amount, or the like.

The driving part 120 may drive at least one hardware component included in the electronic apparatus 100. The driving part 120 may generate a physical force and transmit the same to at least one hardware component included in the electronic apparatus 100.

Here, the driving part 120 may generate driving power for a movement of the hardware component included in the electronic apparatus 100 (for example, movement of the electronic apparatus 100) or a rotation operation of the component (for example, rotation of the projection lens).

In detail, the driving part 120 may protrude at least a portion of the projecting part 112 retracted in the main body 103 outside the main body 103 (e.g., one side of the main body 103). Meanwhile, the projecting part 112 may be retracted by a separate retraction part and protrude outside the main body 103. Here, the driving part 120 may protrude the retraction part which retracts the projecting part 112 outside the main body 103.

In addition, the driving part 120 may protrude at least a portion of the projecting part 112 through the first path or the second path. Here, the first path may be a path along which the projecting part 112 is moved in a direction parallel to ground where the electronic apparatus 100 is positioned. In addition, the second path may be a path along which the projecting part 112 is moved in a vertical or diagonal direction from the ground where the electronic apparatus 100 is positioned.

In addition, the driving part 120 may rotate the screen 106 coupled to one side of the main body 103. Alternatively, the driving part 120 may protrude the screen 106 retracted in the main body 103 outside the main body 103 (for example, to the top of the main body 103).

In addition, the driving part 120 may adjust a projection direction (or projection angle) of the projecting part 112. In addition, the driving part 120 may move the position of the electronic apparatus 100. Here, the driving part 120 may control a moving member 109 to move the electronic apparatus 100. For example, the driving part 120 may control the moving member 109 using a motor.

In addition, the driving part 120 may rotate the screen 106. In detail, the driving part 120 may rotate the screen 106 by 90 degrees while the projection plane of the screen 106 is in contact with one surface (e.g., upper surface) of the main body 103.

The sensor part 121 may include at least one sensor. In detail, the sensor part 121 may include at least one of a tilt sensor for sensing a tilt of the electronic apparatus 100, an image sensor for capturing an image, an illumination sensor, a distance sensor, a depth sensor, and a lidar sensor. Here, the tilt sensor may be an accelerometer or a gyro sensor, and the image sensor may be a camera or a depth camera. Meanwhile, the tilt sensor may be described as a movement sensor. Here, the distance sensor may be a time of flight (ToF) sensor.

Meanwhile, the electronic apparatus 100 may be linked with the external device to control its illumination function. In detail, the electronic apparatus 100 may receive illumination information from the external device. Here, the illumination information may include at least one of brightness information or color temperature information set by the external device. Here, the external device may be a device connected to the same network as the electronic apparatus 100 (e.g., internet of things (IoT) device included in the same home/work network) or a device not connected to the same network as the electronic apparatus 100 but capable of communicating with the electronic apparatus 100 (e.g., remote control server). For example, assume that an external illumination device (e.g., IoT device) included in the same network as the electronic apparatus 100 outputs red light having a brightness of 50. The external illumination device (e.g., IoT device) may directly or indirectly transmit the illumination information (e.g., information indicating that the red light is output with the brightness of 50) to the electronic apparatus 100. Here, the electronic apparatus 100 may control the output of the light source based on the illumination information received from the external illumination device. For example, the electronic apparatus 100 may output the red light with the brightness of 50 in case that the illumination information received from the external illumination device includes the information indicating that the red light is output with the brightness of 50.

Meanwhile, the electronic apparatus 100 may control the illumination function, based on biometric information. In detail, the processor 111 may obtain user biometric information. Here, the biometric information may include at least one of the body temperature, heart rate, blood pressure, breath, or electrocardiogram of the user. Here, the biometric information may include various information other than the above-mentioned information. For example, the electronic apparatus 100 may include a sensor for measuring the biometric information. The processor 111 may obtain the user biometric information from the sensor, and control the output of the light source based on the obtained biometric information. For another example, the processor 111 may receive the biometric information from the external device through the input/output interface 116. Here, the external device may be the portable communication device (e.g., smartphone or wearable device) of the user. The processor 111 may obtain the user biometric information from the external device, and control the output of the light source based on the obtained biometric information. Meanwhile, according to an implementation example, the electronic apparatus 100 may identify whether the user is sleeping, and in case that the user is identified as sleeping (or preparing to sleep), the processor 111 may control the output of the light source based on the user biometric information.

The electronic apparatus 100 according to an embodiment of the disclosure may provide various smart functions.

The electronic apparatus 100 may be connected to a portable terminal device controlling the electronic apparatus 100, and the screen output from the electronic apparatus 100 may be controlled by the user input which is input from the portable terminal device. For example, the portable terminal device may be implemented as a smartphone including a touch display, the electronic apparatus 100 may receive screen data provided by the portable terminal device from the portable terminal device and output the data, and the screen output by the electronic apparatus 100 may be controlled based on the user input that is input from the portable terminal device.

The electronic apparatus 100 may be connected to the portable terminal device by using various communication methods such as miracast, airplay, wireless Desktop Experience (DeX) and a remote personal computer (PC) method, and may share a content or music, provided by the portable terminal device.

In addition, the portable terminal device and the electronic apparatus 100 may be connected to each other by various connection methods. In an example, the portable terminal device may search for the electronic apparatus 100 and perform wireless connection therebetween, or the electronic apparatus 100 may search for the portable terminal device and perform the wireless connection therebetween. The electronic apparatus 100 may then output the content provided from the portable terminal device.

In an example, the electronic apparatus 100 may output the content or music being output from the portable terminal device in case that the portable terminal device is positioned around the electronic apparatus and the predetermined gesture (e.g., motion tap view) is then detected through the display of the portable terminal device, while the specific content or music is being output from the portable terminal device.

In an example, the electronic apparatus 100 may output the content or music being output from the portable terminal device in case that it is detected that the portable terminal device is positioned around the electronic apparatus 100 by a predetermined distance or less (e.g., non-contact tap view), or the portable terminal device touches the electronic apparatus 100 twice at short intervals (e.g., contact tap view) in the state where the specific content or music is being output from the portable terminal device.

In the above example, the screen provided by the portable terminal device is the same as the screen provided by the electronic apparatus 100. However, the disclosure is not limited thereto. That is, in case that the portable terminal device and the electronic apparatus 100 are connected to each other, the portable terminal device may output a first screen provided by the portable terminal device, and the electronic apparatus 100 may output a second screen provided by the portable terminal device, which is different from the first screen. For example, the first screen may be a screen provided by a first application installed in the portable terminal device, and the second screen may be a screen provided by a second application installed in the portable terminal device. For example, the first screen and the second screen may be the screens different from each other that are provided by one application installed in the portable terminal device. In addition, for example, the first screen may be a screen including the UI in a remote controller form for controlling the second screen.

The electronic apparatus 100 according to the disclosure may output a standby screen. For example, the electronic apparatus 100 may output the standby screen in case that the electronic apparatus 100 and the external device are not connected to each other or in case that there is no input received from the external device for the predetermined time. A condition for the electronic apparatus 100 to output the standby screen is not limited to the above-described example, and the standby screen may be output based on various conditions.

The electronic apparatus 100 may output the standby screen in the form of a blue screen, and the disclosure is not limited thereto. For example, the electronic apparatus 100 may obtain an atypical object by extracting only the shape of a specific object from the data received from the external device, and output the standby screen including the obtained atypical object.

Meanwhile, the electronic apparatus 100 may further include a display.

The display may be implemented as various types of displays such as a liquid crystal display (LCD), an organic light emitting diode (OLED) display, a plasma display panel (PDP), and the like. The display may also include a driving circuit, a backlight unit, and the like, which may be implemented in a form such as an amorphous silicon thin film transistor (a-si TFT), a low temperature poly silicon (LTPS) TFT, or an organic TFT (OTFT). Meanwhile, the display may be implemented as a touch screen combined with a touch sensor, a flexible display, a three-dimensional (3D) display, or the like. In addition, the display according to the various embodiments of the disclosure may include not only a display panel outputting the image, but also a bezel housing the display panel. In particular, the bezel may include the touch sensor detecting user interaction according to the various embodiments of the disclosure.

Meanwhile, the electronic apparatus 100 may further include a shutter part.

The shutter part may include at least one of a shutter, a fixing member, a rail, or a body.

Here, the shutter may block light output from the projecting part 112. Here, the fixing member may fix a position of the shutter. Here, the rail may be a path to move the shutter or the fixing member. Here, the body may be a component that includes the shutter and the fixing member.

Meanwhile, a detailed control operation of the processor 111 is described below in detail with reference to the drawings.

The processor 111 may obtain the information on the projection plane using the sensor part 121. Here, the information on the projection plane may include at least one of information on a size of the projection plane or information on a distance between the electronic apparatus 100 and the projection plane.

Figure 3:
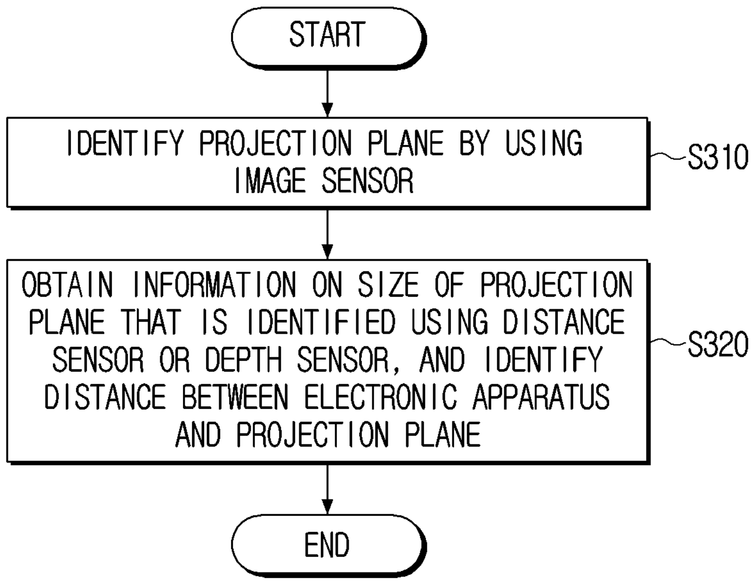
FIG. 3 is a flow chart for explaining a method of obtaining information on the projection plane by the electronic apparatus according to an embodiment of the disclosure.

In detail, referring to FIG. 3, the processor 111 may identify the projection plane by using the image sensor (S310). In detail, the processor 111 may identify the wall or the screen around the electronic apparatus 100 as the projection plane by using the image surrounding the electronic apparatus 100 that is obtained through the image sensor.

In addition, the processor 111 may obtain the information on the size of the projection plane that is identified using the distance sensor or the depth sensor, and identify the distance between the electronic apparatus 100 and the projection plane (S320). Here, the distance between the electronic apparatus 100 and the projection plane may be a distance between the distance sensor or the depth sensor and the projection plane.

In addition, based on the information on the projection plane, the processor 111 may identify the protrusion distance of the projecting part 112 corresponding to the projection plane.

Here, the protrusion distance of the projecting part 112 that corresponds to the projection plane may be a distance at which the projecting part 112 protrudes from the main body 103 to project the image on the projection plane. In detail, a distance between the projecting part 112 and the projection plane for projecting the image on the projection plane may be changed based on the size of the projection plane. Here, the distance between the projecting part 112 and the projection plane for projecting the image on the projection plane may be increased as the size of the projection plane is increased.

Meanwhile, the protrusion distance of the projecting part 112 that corresponds to the projection plane may indicate the minimum protrusion distance of the projecting part 112 that is required for the projecting part 112 to project the image on the projection plane. That is, the protrusion distance of the projecting part 112 that corresponds to the projection plane may be the protrusion distance of the projecting part 112 in case that light projected from the projecting part 112 is emitted only to the projection plane. That is, the processor 111 may identify the protrusion distance of the projecting part 112 for light projected from the projecting part 112 to be emitted only to the projection plane.

Figure 4:
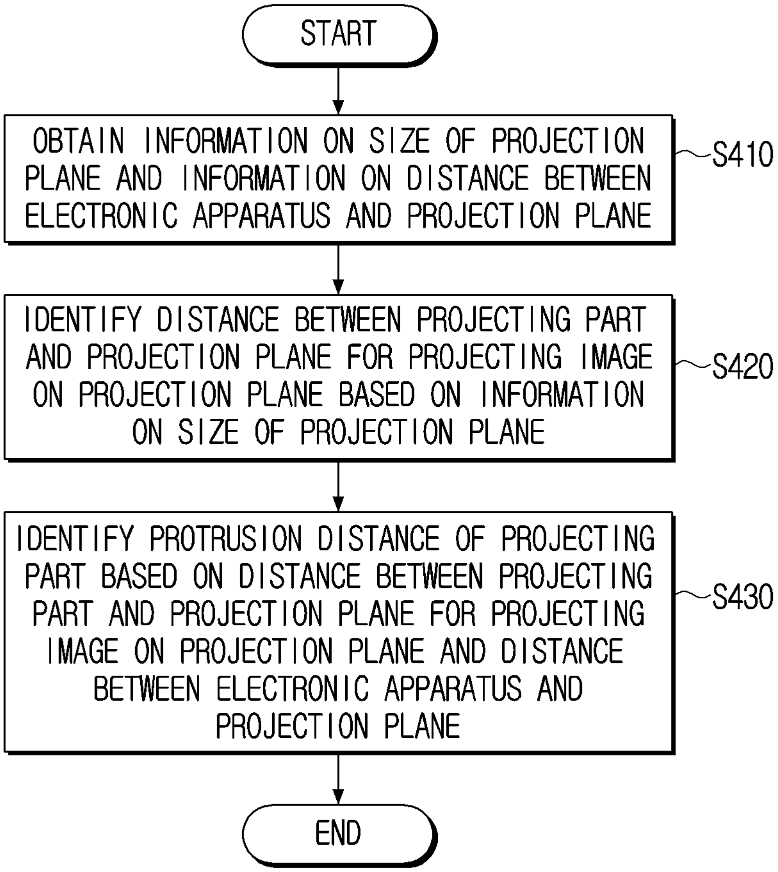
FIG. 4 is a flowchart for explaining a method of identifying a protrusion distance of a projecting part that corresponds to the projection plane by the electronic apparatus according to an embodiment of the disclosure.

In detail, referring to FIG. 4, the processor 111 may obtain the information on the size of the projection plane and the information on the distance between the electronic apparatus 100 and the projection plane by using the sensor part 121 (S410).

In detail, the processor 111 may identify the distance between the projecting part 112 and the projection plane for projecting the image on the projection plane based on the information on the size of the projection plane (S420). Here, the memory 113 may store the information on the distance between the projecting part 112 and the projection plane, which corresponds to the size of the projection plane. In addition, the processor 111 may obtain the information on the distance between the projecting part 112 and the projection plane that corresponds to the size of the projection plane.

In addition, the processor 111 may identify the protrusion distance of the projecting part 112 based on the distance between the projecting part 112 and the projection plane for projecting the image on the projection plane and the distance between the electronic apparatus 100 and the projection plane (S430).

Figure 5:
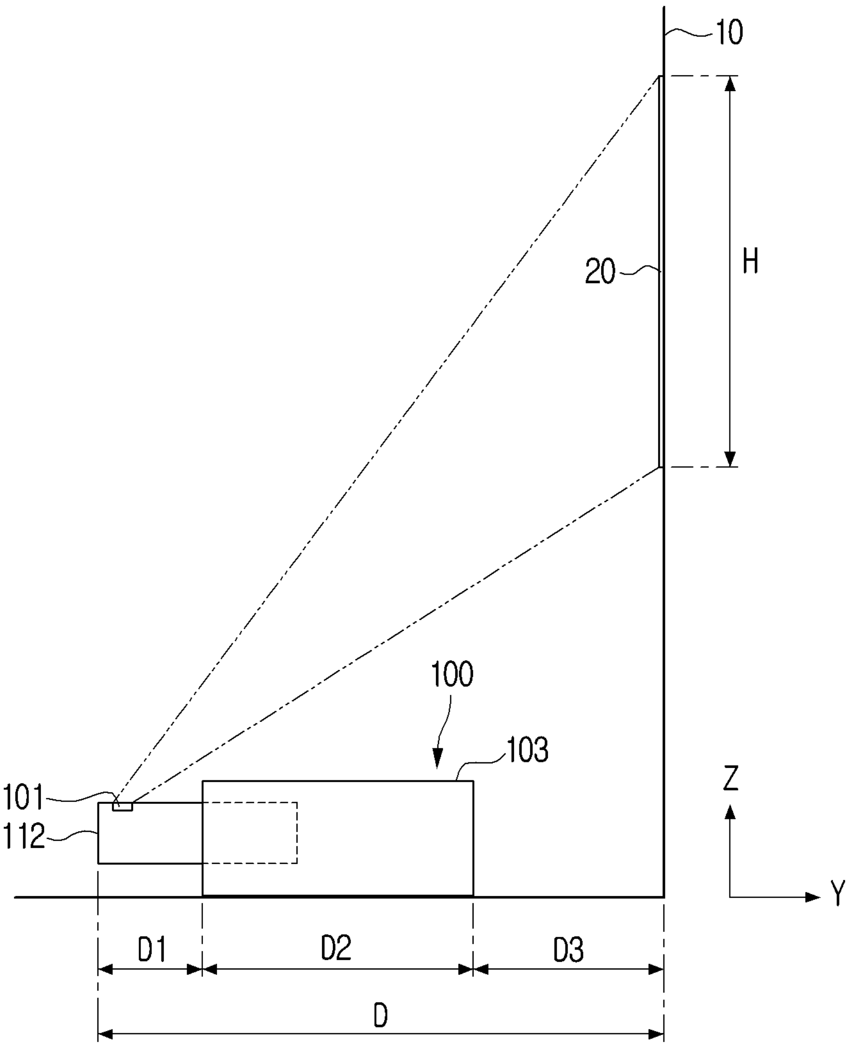
FIG. 5 is a diagram for explaining a method of identify the protrusion distance of the projecting part that corresponds to the projection plane by the electronic apparatus according to an embodiment of the disclosure.

For example, referring to FIG. 5, in case that the size of the projection plane 20 is H, the distance between the projecting part 112 and the projection plane 20 for projecting the image on the projection plane 20 may be D. Here, the size H of the projection plane 20 may be a vertical length of the projection plane 20, which is only an embodiment, and the size H of the projection plane 20 may be one of a diagonal length of the projection plane 20, a horizontal length of the projection plane 20, or an area of the projection plane 20.

Here, a distance D between the projecting part 112 and the projection plane 20 may have the sum of a protrusion distance D1 of the projecting part 112, a length D2 of the main body 103, and a distance D3 between the electronic apparatus 100 and the projection plane 20. Here, the length D2 of the main body 103 may be stored in the memory 113. In addition, the distance between the electronic apparatus 100 and the projection plane 20 may be obtained by the sensor part 121.

Accordingly, the processor 111 may identify the protrusion distance D1 of the projecting part 112 in case that the protrusion distance of the projecting part 112 is D. In detail, the processor 111 may identify the protrusion distance D1 of the projecting part 112 by using the distance D between the projecting part 112 and the projection plane 20 for projecting the image on the projection plane 20, the length D2 of the main body 103, and the distance D3 between the electronic apparatus 100 and the projection plane 20.

That is, the processor 111 may identify the protrusion distance D1 of the projecting part 112 for the sum of the protrusion distance D1 of the projecting part 112, the length D2 of the main body 103, and the distance D3 between the electronic apparatus 100 and the projection plane 20 to be the distance D between the projecting part 112 and the projection plane 20 for projecting the image on the projection plane 20.

In other words, the processor 111 may identify the protrusion distance of the projecting part 112 that corresponds to the projection plane 20 based on the size of the projection plane 20 and the distance between the electronic apparatus 100 and the projection plane 20. Here, the larger the size of the projection plane 20, the greater the identified protrusion distance of the projecting part 112. In addition, the greater the distance between the electronic apparatus 110 and the projection plane 20, the less the identified protrusion distance of the projecting part 112.

In detail, the processor 111 may identify the protrusion distance of the projecting part 112 as a first protrusion distance in case that the size of the projection plane 20 is a first size. In addition, the processor 111 may identify the protrusion distance of the projecting part 112 as a second protrusion distance that is greater than the first distance in case that the size of the projection plane 20 is a second size that is larger than the first size.

In addition, the processor 111 may identify the protrusion distance of the projecting part 112 as the first protrusion distance in case that the distance between the electronic apparatus 100 and the projection plane 20 is a first distance. In addition, the processor 111 may identify the protrusion distance of the projecting part 112 as the second protrusion distance that is less than the first protrusion distance in case that the distance between the electronic apparatus 100 and the projection plane 20 is a second distance that is greater than the first distance.

Meanwhile, according to an embodiment of the disclosure, the protrusion distance of the projecting part 112 that corresponds to the projection plane may be changed based on an operation mode of the electronic apparatus 100. In detail, the processor 111 may identify the protrusion distance of the projecting part 112 that corresponds to the projection plane based on the operation mode of the electronic apparatus 100 and the information on the projection plane.

Here, the processor 111 may obtain the user input for selecting the operation mode of the electronic apparatus 100 through the manipulation interface 115. In addition, in case of obtaining the user input for selecting the operation mode of the electronic apparatus 100, the processor 111 may control the electronic apparatus 100 to be operated based on the selected operation mode.

In addition, the operation mode of the electronic apparatus 100 may be one of a first mode (retraction mode) where the entire projecting part 112 is retracted in the main body, a second mode (information display mode) where the projecting part 112 protrudes by the first distance and displays information on a portion of the projection plane, and a third mode (content display mode) where the projecting part 112 protrudes by the second distance that is greater than the first distance, and projects the content on the projection plane.

Figure 6A:
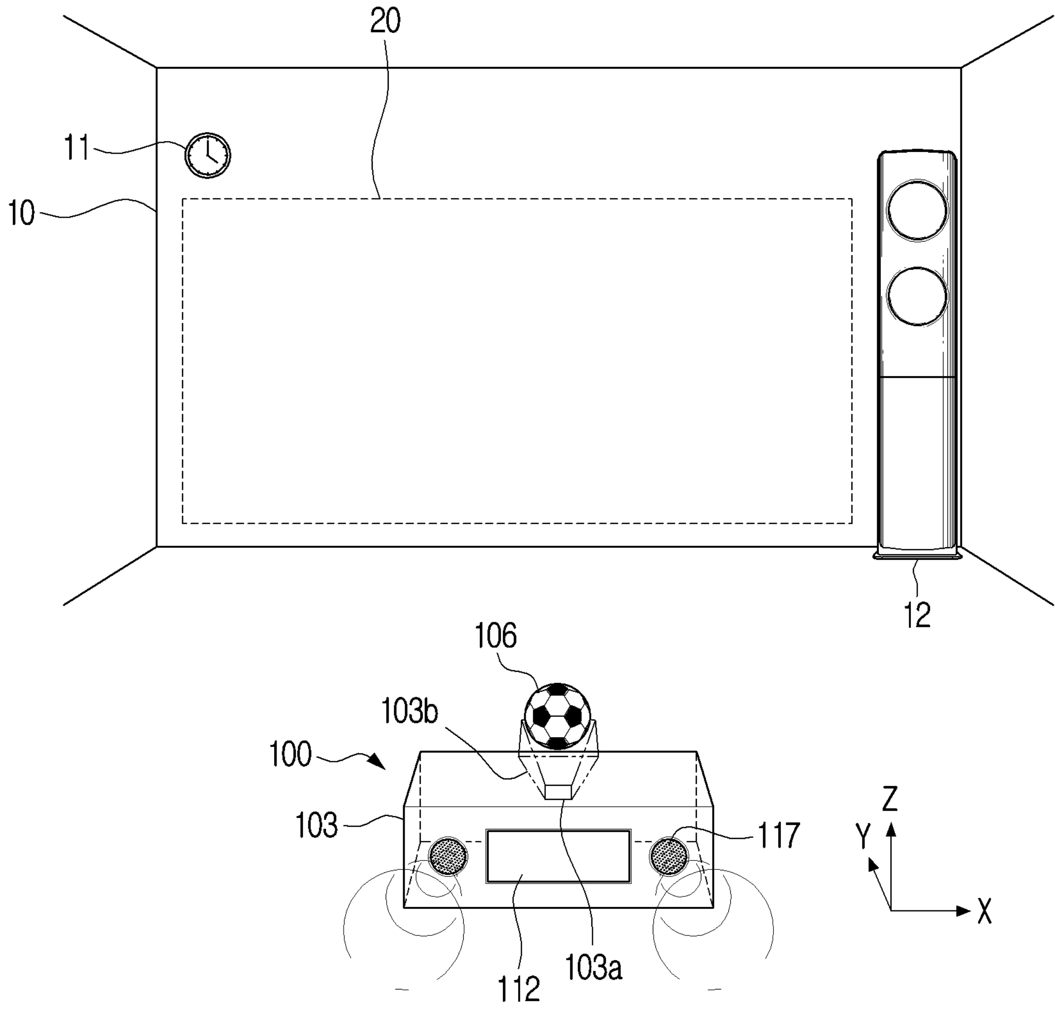
FIG. 6A is a diagram for explaining a first operation mode of the electronic apparatus according to an embodiment of the disclosure.

For example, referring to FIG. 6A, in the first mode, the entire projecting part 112 may be retracted in the main body 103. In addition, the projecting part 112 may not project the image on the projection plane 20. Here, the processor 111 may control the speaker 117 to output the audio signal.

Alternatively, the processor 111 may control the projecting part 112 to display a hologram 106 at the top of the main body 103. In detail, the top of the main body 103 may include at least one opening 103*a*. Here, the projecting part 112 retracted in the main body 103 may project light to display the hologram 106 through at least one opening 103*a* included in the top of the main body 103. Here, a separate structure 103*b* that displays the hologram 106 in case of projecting light for displaying the hologram 106 may be further installed at the top of the main body 103.

Figure 6B:
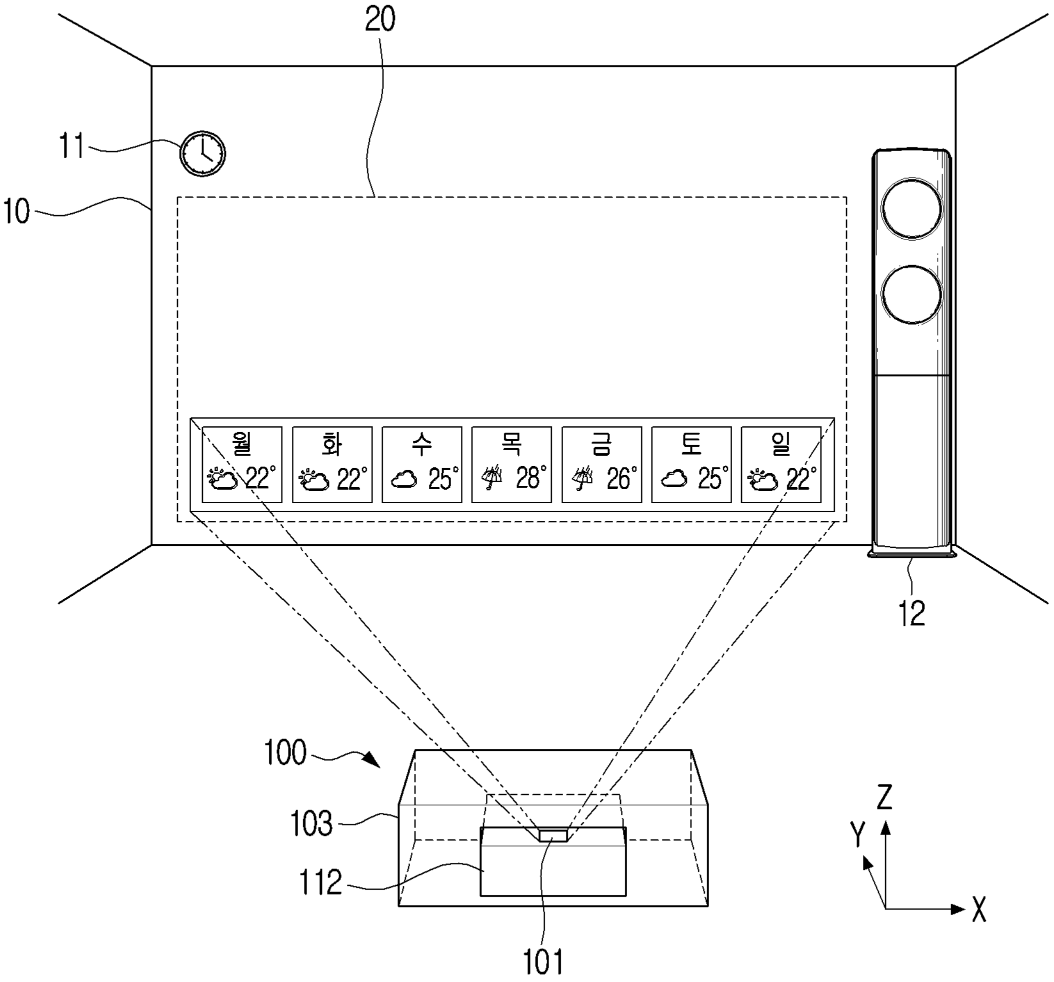
FIG. 6B is a diagram for explaining a second operation mode of the electronic apparatus according to an embodiment of the disclosure.

In addition, referring to FIG. 6B, in the second mode, a portion of the projecting part 112 may protrude by the first distance. In addition, the processor 111 may here control the projecting part 112 to display the information on a portion of the projection plane 20. As shown in FIG. 5B, the information may here be weather information, which is only an embodiment, and the information displayed on the projection plane 20 may include various information such as text information and news information.

Figure 6C:
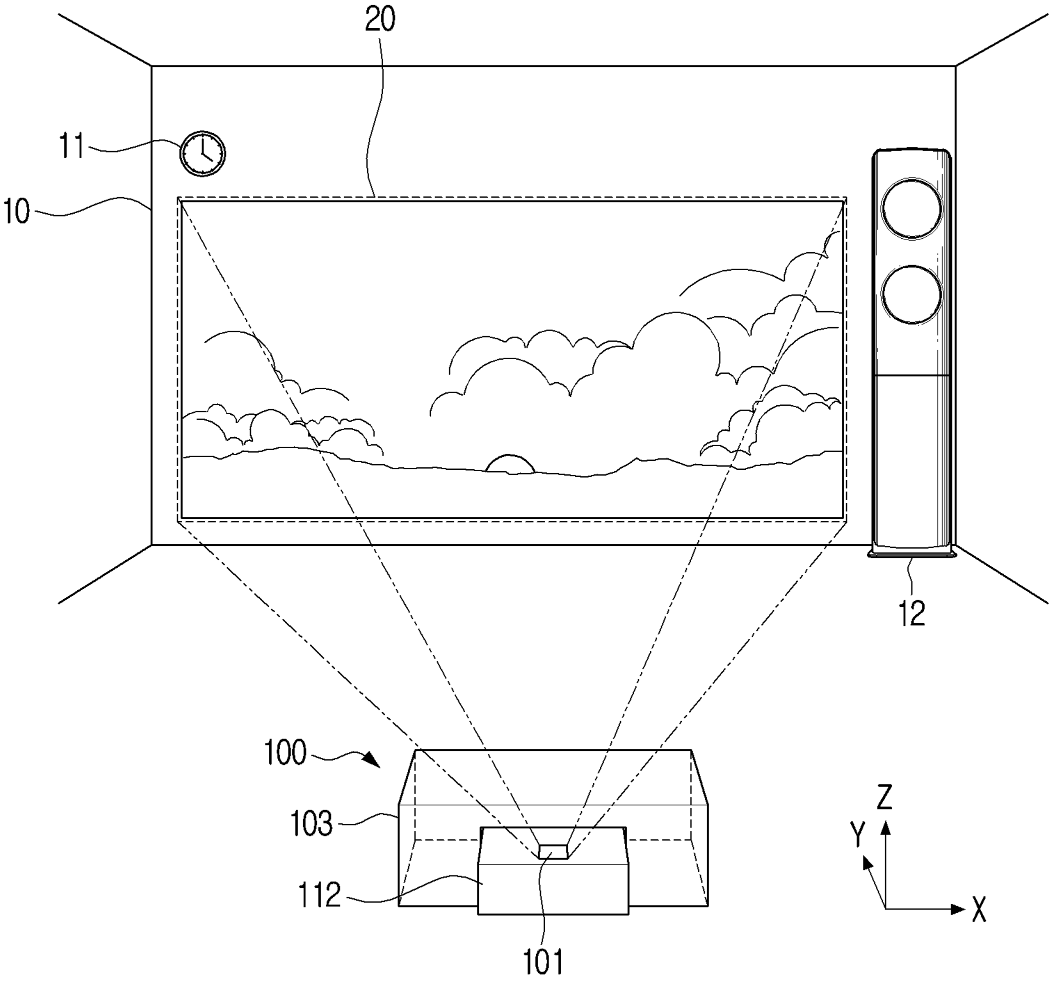
FIG. 6C is a diagram for explaining a third operation mode of the electronic apparatus according to an embodiment of the disclosure.

In addition, referring to FIG. 6C, in the third mode, at least a portion of the projecting part 112 may protrude by the second distance that is greater than the first distance. In addition, the processor 111 may control the projecting part 112 to display the content on the projection plane 20.

Here, in case that the operation mode of the electronic apparatus 100 is the first mode, the processor 111 may identify the protrusion distance of the projecting part 112 that corresponds to the projection plane as 0. Here, the processor 111 may control the speaker 117 to output the audio, or control the projecting part 112 to display the hologram at the top of the main body 103.

In addition, in case that the operation mode of the electronic apparatus 100 is the second mode, the processor 111 may identify the protrusion distance of the projecting part 112 for displaying the information on a portion of the projection plane based on the information on the projection plane.

In addition, in case that the operation mode of the electronic apparatus 100 is the third mode, the processor 111 may identify the protrusion distance of the projecting part 112 for projecting the content on the projection plane based on the information on the projection plane.

Meanwhile, in case of identifying the protrusion distance of the projecting part 112 that corresponds to the projection plane, the processor 111 may protrude the projecting part 112 based on the protrusion distance of the projecting part 112 that corresponds to the projection plane, and control the projecting part 112 to project the image on the projection plane. Here, the processor 111 may control the driving part 120 to protrude the projecting part 112 from the main body 103.

Figure 7:
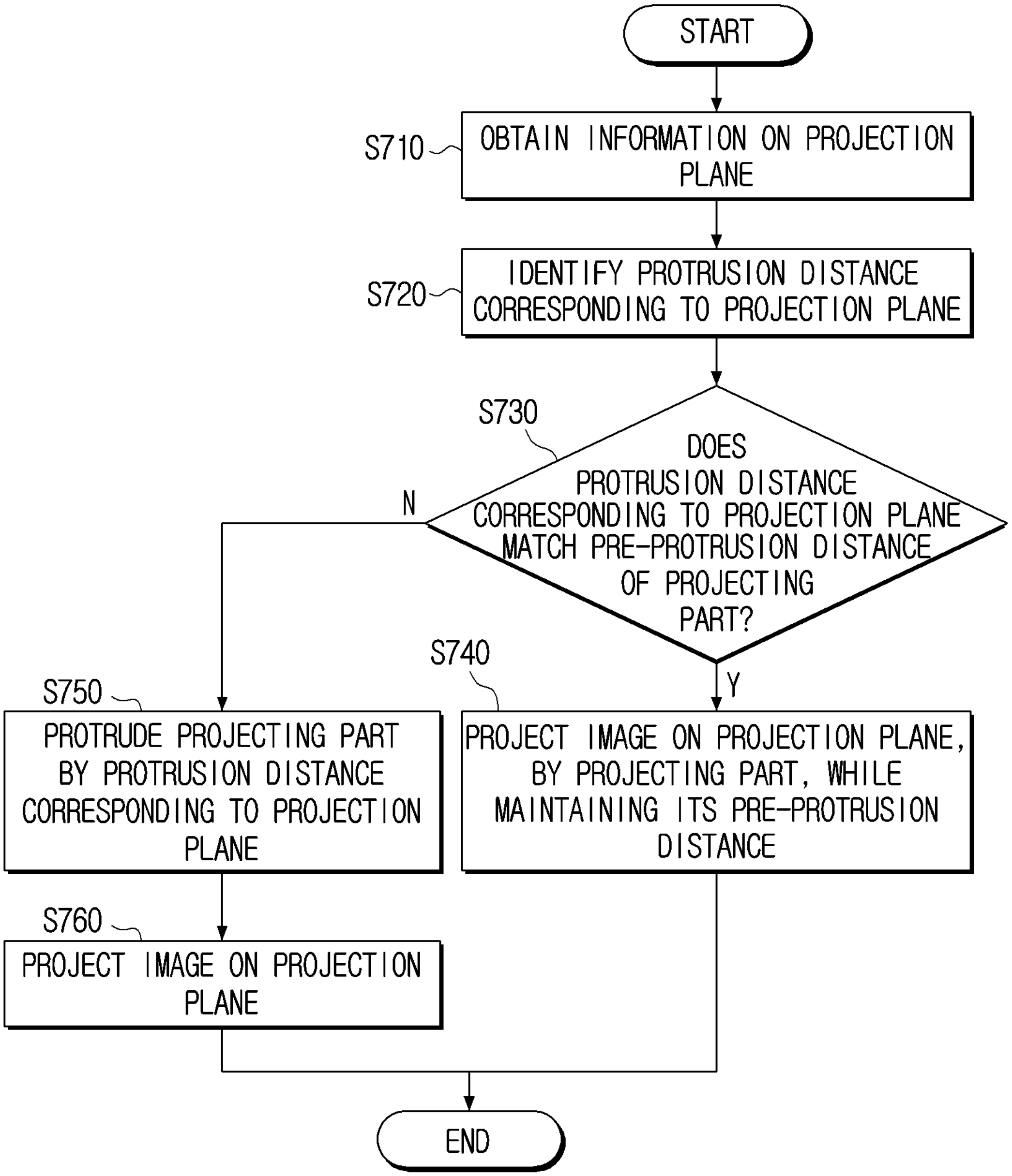
FIG. 7 is a flowchart for explaining a method of protruding the projecting part by the electronic apparatus according to an embodiment of the disclosure.

In detail, referring to FIG. 7, the processor 111 may obtain the information on the projection plane (S710), and identify the protrusion distance of the projecting part 112 that corresponds to the projection plane (S720).

In addition, the processor 111 may identify whether the protrusion distance of the projecting part 112 that corresponds to the projection plane matches a pre-protrusion distance of the projecting part 112 from the main body 103 (S730).

In case that the pre-protrusion distance of the projecting part 112 from the main body 103 matches the protrusion distance of the projecting part 112 that corresponds to the projection plane (S730-Y), the processor 111 may control the projecting part 112 for the projecting part 112 to project the image on the projection plane while maintaining the pre-protrusion distance from the main body 103 (S740).

In addition, in case that the pre-protrusion distance of the projecting part 112 from the main body 103 and the protrusion distance of the projecting part 112 that corresponds to the projection plane are different from each other (S730-N), the processor 111 may protrude the projecting part 112 to the protrusion distance corresponding to the projection plane. That is, the processor 111 may protrude the projecting part 112 for the protrusion distance of the projecting part 112 to be the protrusion distance corresponding to the projection plane (S750).

In addition, in case that the projecting part 112 protrudes by the protrusion distance corresponding to the projection plane, the processor 111 may control the projecting part 112 to project the image on the projection plane (S760).

Meanwhile, according to an embodiment of the disclosure, the processor 111 may protrude the projecting part 112 through the plurality of paths.

In detail, the processor 111 may protrude the projecting part 112 through the first path or the second path. Here, the first path may be the path in which the projecting part 112 is moved in the direction parallel to the ground where the electronic apparatus 100 is positioned. In addition, the second path may be the path in which the projecting part 112 is moved in the vertical or diagonal direction from the ground where the electronic apparatus 100 is positioned.

That is, the processor 111 may protrude the projecting part 112 in a first direction, or protrude the projecting part 112 in a second direction. Here, the first direction may indicate the direction parallel to the ground where the electronic apparatus 100 is positioned, and the second direction may be the vertical or diagonal direction from the ground where the electronic apparatus 100 is positioned.

Here, the processor 111 may protrude the projecting part 112 along the first path in case that the protrusion distance of the projecting part 112 is less than a predetermined distance. In addition, the processor 111 may protrude the projecting part 112 along the second path in case that the protrusion distance of the projecting part 112 is the predetermined distance or more.

Figure 8A:
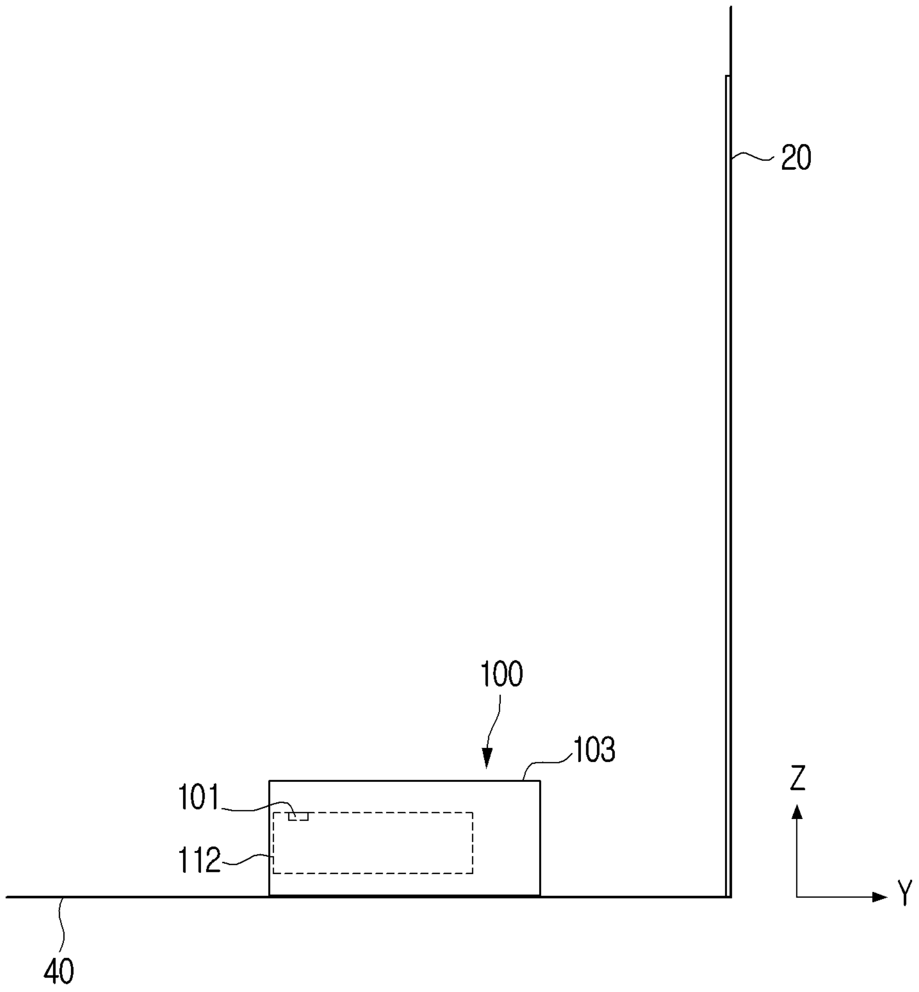
FIG. 8A, FIG. 8B, FIG. 8C, FIG. 8D, and FIG. 8E are diagrams for explaining a path of protruding the projecting part by the electronic apparatus according to an embodiment of the disclosure.

For example, as shown in FIG. 8A, the processor 111 may obtain the information on the projection plane 20 while the projecting part 112 is retracted in the main body 103.

In addition, the processor 111 may identify the protrusion distance of the projecting part 112 that corresponds to the projection plane based on the information on the projection plane 20. For example, the processor 111 may identify the protrusion distance of the projecting part 112 as 50 cm. In addition, the predetermined distance may be 30 cm.

Here, the processor 111 may protrude the projecting part 112 along the first path (a movement path in an y-axis direction). Here, the first path may indicate a direction horizontal to a ground 40.

Figure 8B:
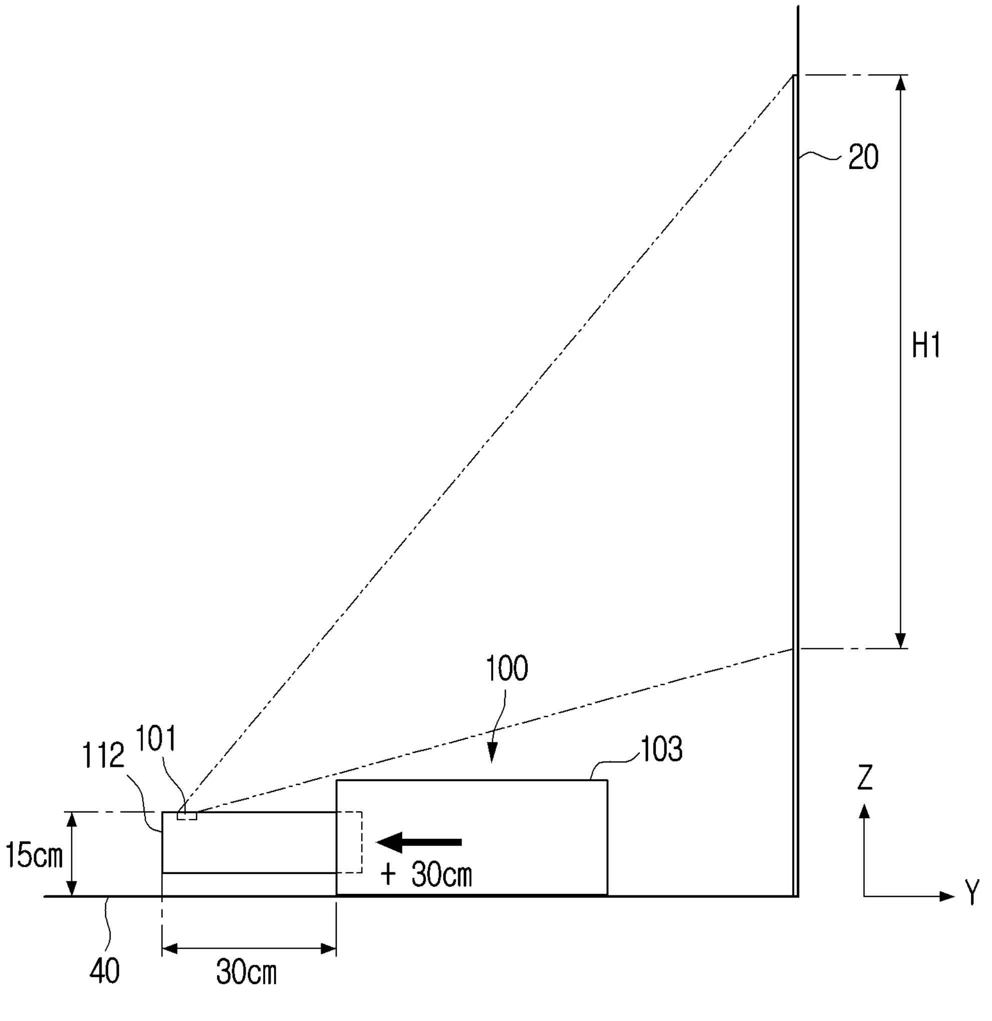

Here, as shown in FIG. 8B, the processor 111 may protrude the projecting part 112 by the predetermined distance of 30 cm. Here, a size of a projectable area of the projecting part 112 may be H1.

In addition, in case that the projecting part 112 protrudes by the predetermined distance of 30 cm, the processor 111 may protrude the projecting part 112 along the second path (a movement path in a z-axis direction or the z-axis and y-axis directions). Here, the second path could be the path that gets further away from the ground 40.

Figure 8C:
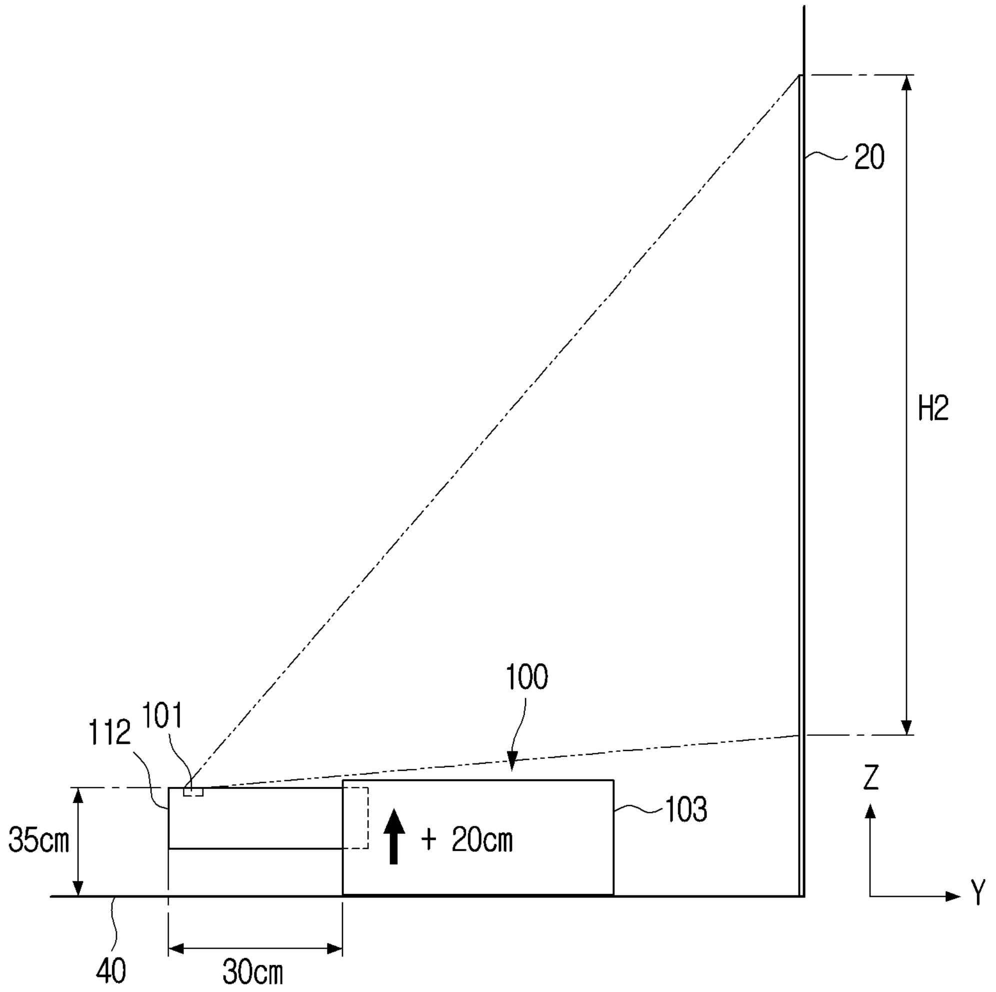

Here, as shown in FIG. 8C, the processor 111 may protrude the projecting part 112 in a direction perpendicular to the ground 40 by 20 cm excluding the predetermined distance of 30 cm from the protrusion distance of 50 cm corresponding to the identified projection plane. Here, the size of the projectable area of the projecting part 112 may be H2 that is larger than H1.

Figure 8D:
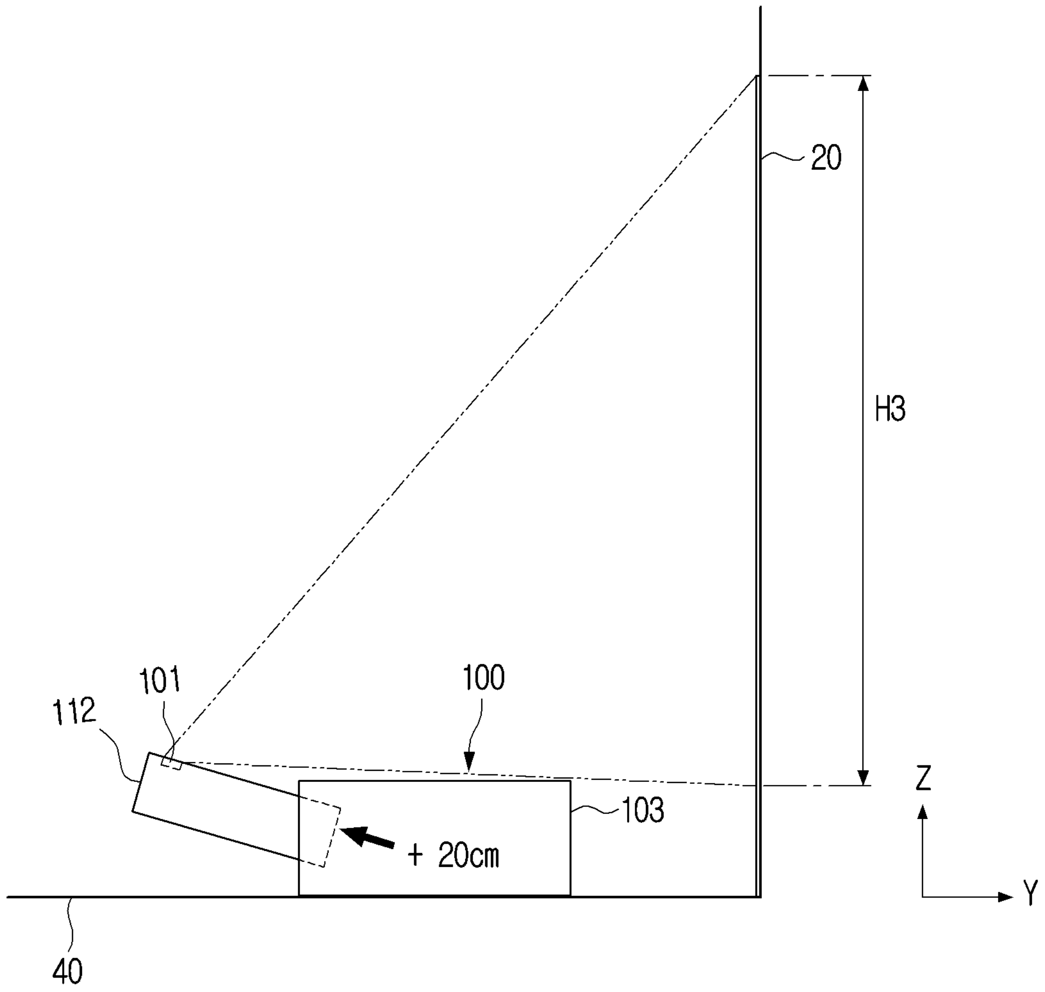

Alternatively, as shown in FIG. 8D, the processor 111 may protrude the projecting part 112 in a diagonal direction from the ground 40 by 20 cm excluding the predetermined distance of 30 cm from the protrusion distance of 50 cm corresponding to the identified projection plane. Here, the size of the projectable area of the projecting part 112 may be H3 that is larger than H1.

Figure 8E:
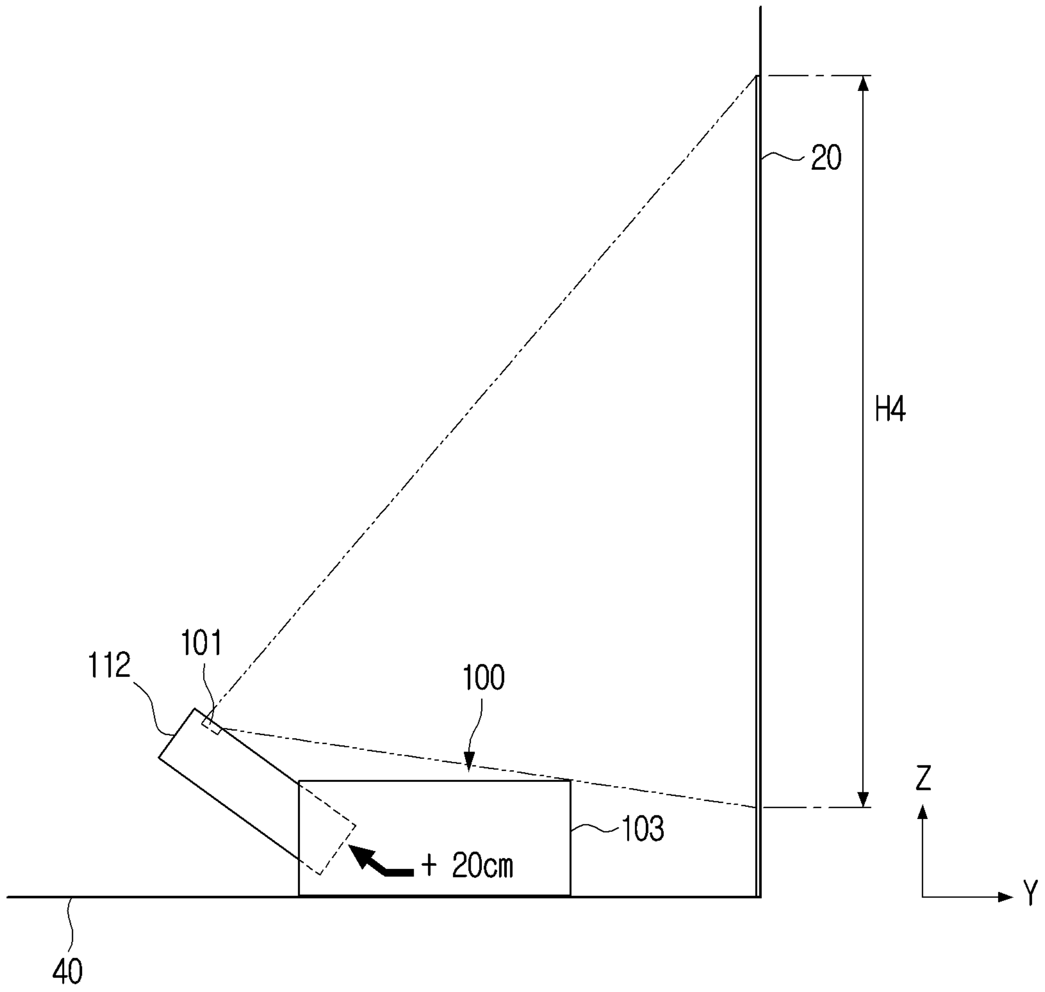

Alternatively, as shown in FIG. 8E, the processor 111 may protrude the projecting part 112 in a curved direction from the ground 40 by 20 cm excluding the predetermined distance of 30 cm from the protrusion distance of 50 cm corresponding to the identified projection plane. Here, the size of the projectable area of the projecting part 112 may be H4 that is larger than H1.

As described above, in case that the projecting part 112 protrudes by the predetermined distance, the electronic apparatus 100 may protrude the projecting part 112 in the vertical, diagonal or curved direction from the ground, thereby reducing a horizontal distance by which the projecting part 112 protrudes from the main body (that is, the protrusion distance of the projecting part 112 in the y-axis direction shown in FIGS. 8A to 8E).

Meanwhile, according to an embodiment of the disclosure, the electronic apparatus 100 may project the image on the projection plane and the screen 106.

In detail, the processor 111 may project the image on the projection plane 20.

Here, the processor 111 may control the driving part 120 to rotate the screen 106 in case that the operation mode of the electronic apparatus 100 is the mode for displaying the content on the projection plane. In detail, the processor 111 may rotate the screen 106 by 90 degrees while the projection plane of the screen 106 is in contact with one surface (e.g., upper surface) of the main body 103.

Alternatively, the processor 111 may rotate the screen 106 for displaying the image information in case of obtaining a user command for displaying the image information while the image is projected on the projection plane.

Figure 9A:
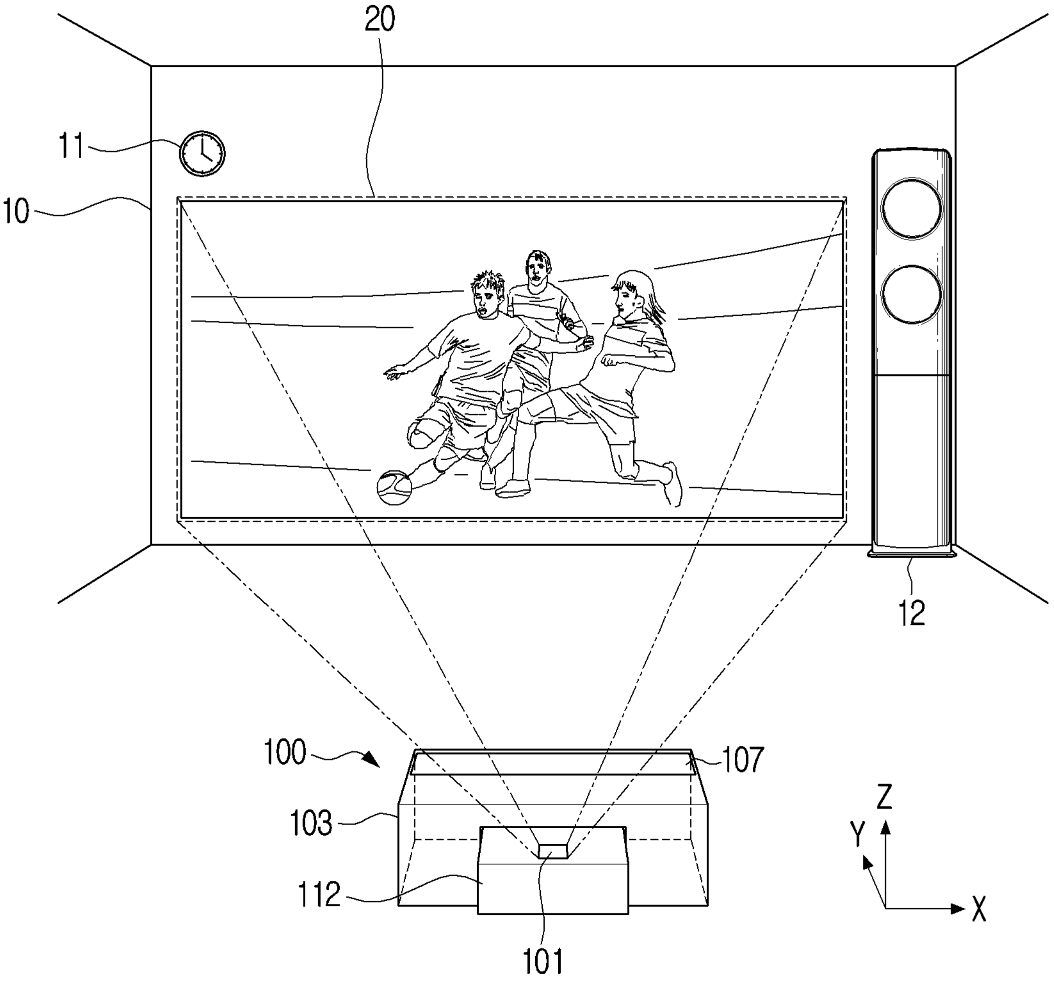
FIG. 9A and FIG. 9B are diagrams for explaining a method of projecting an image and image information together by the electronic apparatus according to an embodiment of the disclosure.
Figure 9B:
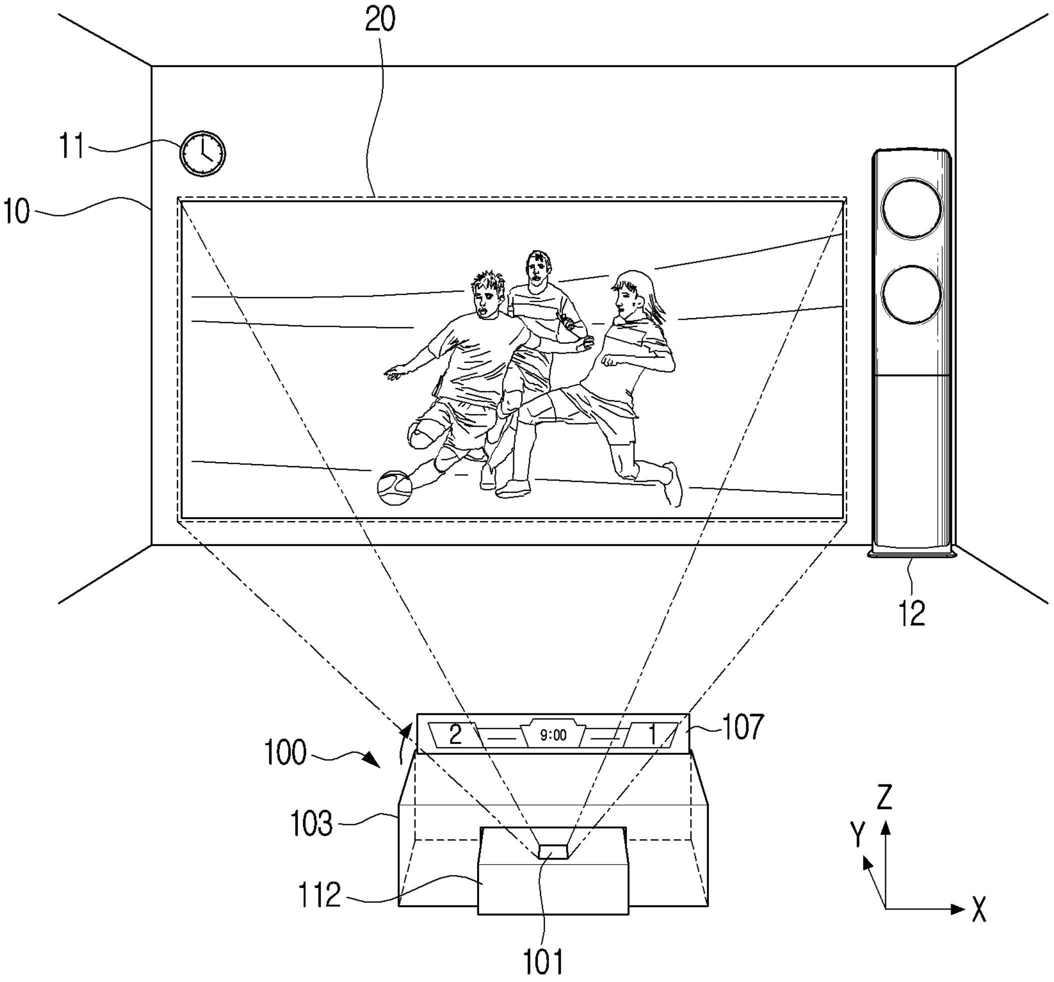

For example, as shown in FIG. 9A, the processor 111 may project a sports image on the projection plane 20. Here, as shown in FIG. 9B, the processor 111 may rotate the screen 106 in case that the mode of the electronic apparatus 100 is the mode for displaying the content, such as the sports image, on the projection plane 20. In addition, the processor 111 may project a sports score status on the rotated screen 106.

Meanwhile, the image information projected on the screen 106 may be different based on a type of the image projected on the projection plane 20. For example, in case that the image projected on the projection plane 20 is the sports image, the image projected on the screen 106 may be the sports score status. Alternatively, in case that the image projected on the projection plane 20 is news, the image projected on the screen 106 may be a headline or weather. Alternatively, in case that the image projected on the projection plane 20 is a music program, the image projected on the screen 106 may be a song title or song lyrics. Alternatively, in case that the image projected on the projection plane 20 is a game, the image projected on the screen 106 may be a game score. Alternatively, in case that the image projected on the projection plane 20 is a video, the image projected on the screen 106 may be a playback progress bar.

Meanwhile, according to an embodiment of the disclosure, the screen 106 may be the rollable screen that may be retracted in the main body 103 and protrude to the top of the main body 103.

Accordingly, in case that the operation mode of the electronic apparatus 100 is the mode for displaying the content on the projection plane, the processor 111 may control the driving part 120 to protrude the screen 106 to the top of the main body 103. Alternatively, the processor 111 may control the driving part 120 to protrude the screen 106 to the top of the main body 103 in case of obtaining the user command for displaying the image information while the image is projected on the projection plane.

In case that the screen 106 protrudes to the top of the main body 103, the processor 111 may project the image information projected on the projection plane to the screen 106.

Meanwhile, according to an embodiment of the disclosure, the electronic apparatus 100 may project the image having a luminance value corresponding to the protrusion distance of the projecting part 112.

In detail, the processor 111 may identify a luminance value corresponding to the protrusion distance of the projecting part 112.

Here, information on the luminance value corresponding to the protrusion distance of the projecting part 112 may be stored in the memory 113.

In addition, the processor 111 may control the projecting part 112 to project the image on the projection plane while having the identified luminance value.

According to the above-described method, the electronic apparatus 100 of the disclosure may project the image having a constant luminance value even in case that the protrusion distance of the projecting part 112 is changed.

Meanwhile, the electronic apparatus 100 according to an embodiment of the disclosure may project the image on the projection plane in linkage with another electronic apparatus.

Here, the operation mode of the electronic apparatus 100 may be one of the first mode or the third mode, and the operation mode of another electronic apparatus may be one of the first mode or the third mode.

Figure 10A:
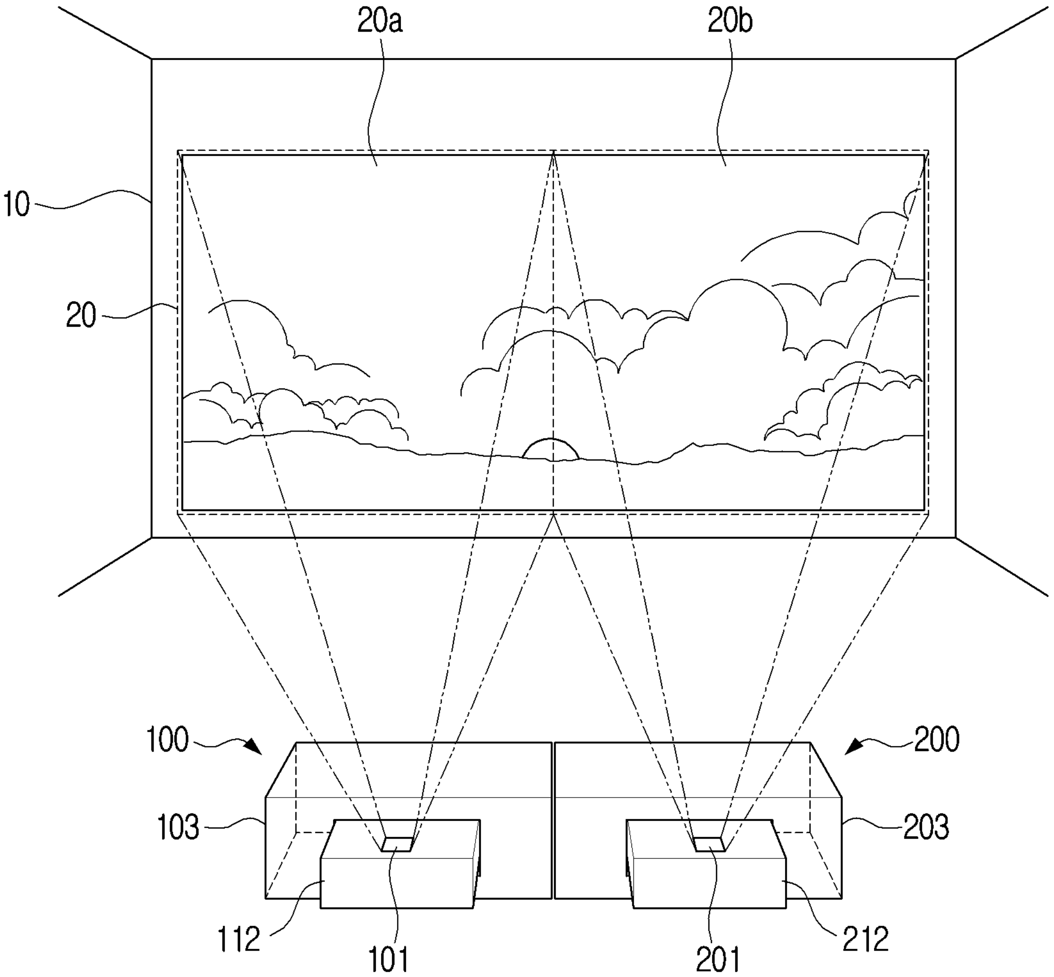
FIG. 10A, FIG. 10B, and FIG. 10C are diagrams for explaining a method of controlling another control device by the electronic apparatus according to an embodiment of the disclosure.

For example, the operation mode of the electronic apparatus 100 may be the third mode for displaying the content, and the operation mode of another electronic apparatus 200 may be the third mode for displaying the content. In this case, as shown in FIG. 10A, the electronic apparatus 100 may project the image on the projection plane 20 in linkage with another electronic apparatus 200. Here, the electronic apparatus 100 may project a portion of the content on a first region 20*a* of the projection plane 20, and another electronic apparatus 200 may project the remaining content on a second region 20*b* of the projection plane 20.

Figure 10B:
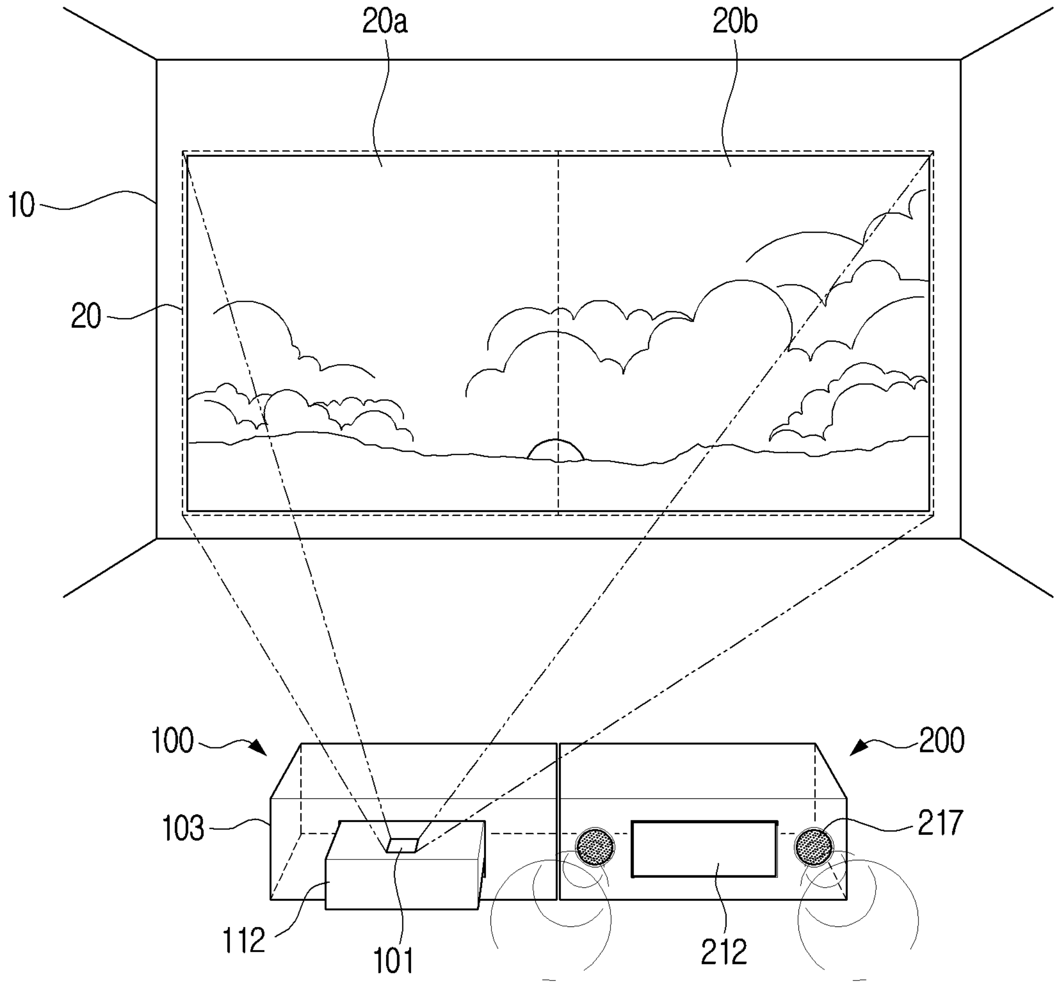

Alternatively, the operation mode of the electronic apparatus 100 may be the third mode for displaying the content, and the operation mode of another electronic apparatus 200 may be the first mode where an entire projecting part 212 of another electronic apparatus 200 is retracted in a main body 203 of another electronic apparatus 200. Here, as shown in FIG. 10B, the electronic apparatus 100 may project a content image on the entire projection plane 20 (or the first projection region 20*a*), and another electronic apparatus 200 may control a speaker 217 to output audio for speaker content.

Figure 10C:
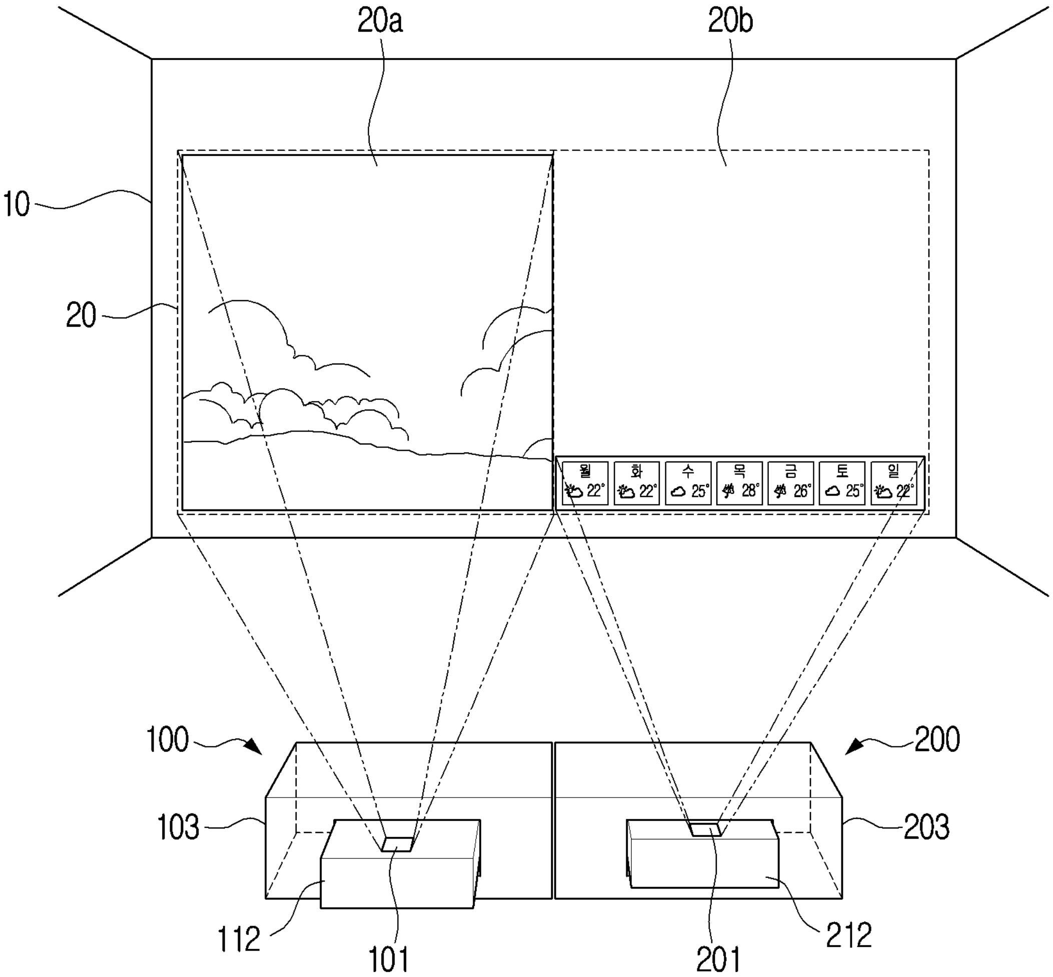

Alternatively, the operation mode of the electronic apparatus 100 may be the third mode for displaying the content, and the operation mode of another electronic apparatus 200 may be the first mode where the entire projecting part 212 of another electronic apparatus 200 is retracted in the main body 203 of another electronic apparatus 200. Here, as shown in FIG. 10C, while the electronic apparatus 100 projects the image on the first area 20*a* of the projection plane 20, another electronic apparatus 200 may project the image including the information from the electronic device 100 on the second area 20*b* of the projection plane 20. Here, as shown in FIG. 10C, the image projected on the second region 20*b* may be the weather information of a district predetermined by the user, which is only an embodiment, and the image projected on the second region 20*b* may include the weather information of a place included in the image projected on the first region 20*a*.

Meanwhile, the processor 111 may control an operation of another electronic apparatus in case of detecting an event while projecting the image on the projection plane in linkage with another electronic apparatus.

In detail, the electronic apparatus 100 may control the operation of another electronic apparatus 200 in case that a content feature or a content genre is changed while the electronic apparatus 100 projects the content on the projection plane.

Alternatively, the electronic apparatus 100 may control the operation of another electronic apparatus 200 in case that a context of the electronic apparatus 100 or a user context is changed while the electronic apparatus 100 projects the content on the projection plane.

Here, the electronic apparatus 100 may protrude the projecting part of another electronic apparatus to a distance corresponding to the event or a distance corresponding to the context. Alternatively, the electronic apparatus 100 may control another electronic apparatus for the projecting part of another electronic apparatus to protrude by the protrusion distance corresponding to the projection plane.

In addition, in case that the projecting part of another electronic apparatus protrudes, the electronic apparatus 100 may control another electronic apparatus for another electronic apparatus to project the image on the projection plane. Alternatively, the electronic apparatus 100 may control another electronic apparatus to output the audio of the image being projected on the projection plane. Alternatively, the electronic apparatus 100 may control another electronic apparatus to project the image information being projected on the projection plane.

Figure 11:
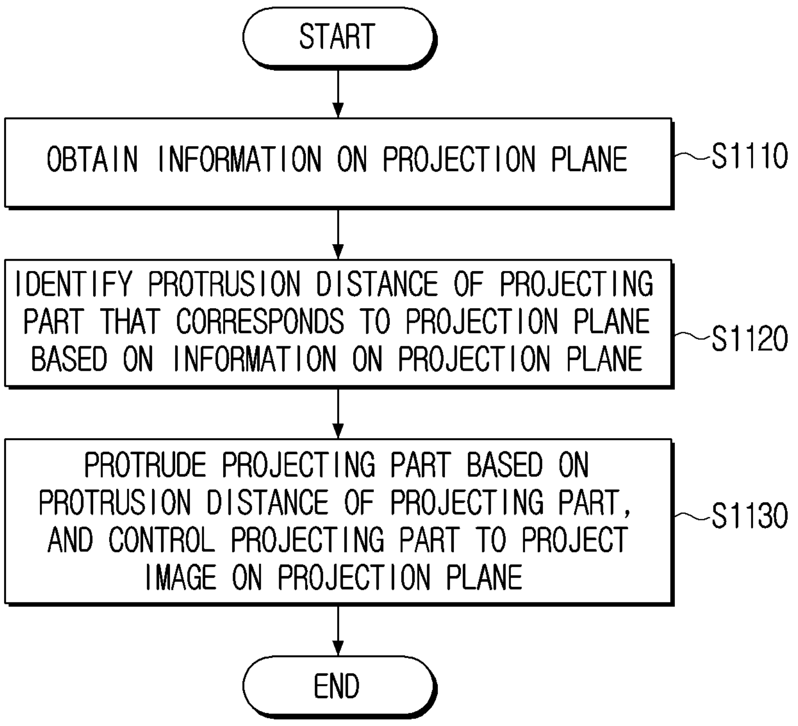
FIG. 11 is a diagram for explaining a method for controlling an electronic apparatus according to an embodiment of the disclosure.

FIG. 11 is a diagram for explaining a method for controlling an electronic apparatus 100 according to an embodiment of the disclosure.

The electronic apparatus 100 may obtain the information on the projection plane (S1110).

In addition, the electronic apparatus 100 may identify the protrusion distance of the projecting part 112 that corresponds to the projection plane based on the information on the projection plane (S1120).

In addition, the electronic apparatus 100 may protrude the projecting part 112 based on the protrusion distance of the projecting part 112, and control the projecting part 112 to project the image on the projection plane (S1130).

Meanwhile, the term "~er/~or" or "module" used in the disclosure may include a unit including hardware, software or firmware, and may be used interchangeably with the term, for example, logic, a logic block, a component or a circuit. The "~er/~or" or "module" may be an integrally formed component, or a minimum unit or part performing one or more functions. For example, the module may include an application-specific integrated circuit (ASIC).

The various embodiments of the disclosure may be implemented by software including an instruction stored in a machine-readable storage medium (for example, a computer readable storage medium). A machine may be a device that invokes the stored instruction from the storage medium, may be operated based on the invoked instruction, and may include the electronic apparatus 100 in the disclosed embodiments. In case that the instruction is executed by the processor, the processor may directly perform a function corresponding to the instruction or other components may perform the function corresponding to the instruction under the control of the processor. The instruction may include a code provided or executed by a compiler or an interpreter. The machine-readable storage medium may be provided in the form of a non-transitory storage medium. Here, a term "non-transitory" may only indicate that the storage medium is tangible without including a signal, and does not distinguish whether data are semi-permanently or temporarily stored in the storage medium.

According to an embodiment, the methods according to the various embodiments disclosed in the present document may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (e.g., PlayStore™). In case of the online distribution, at least a part of the computer program product may be at least temporarily stored or temporarily provided in the storage medium such as a server memory of a manufacturer, a server memory of an application store, or a relay server memory.

Each component (e.g., module or program) in the various embodiments may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic apparatus comprising:

a main body separated from a projection plane by a distance;

a projecting part configured to retract in the main body and protrude from the main body to project an image;

a memory storing at least one instruction; and at least one processor configured to execute the at least one instruction, wherein, by executing the at least one instruction, the at least one processor is configured to, in a state in which the main body is separated from the projection plane by the distance:

obtain information about the projection plane comprising information about the distance between the main body and the projection plane, identify a protrusion distance of the projecting part corresponding to the projection plane based on the information about the distance between the main body and the projection plane, protrude the projecting part based on the protrusion distance, and control the projecting part to project the image on the projection plane.

2. The apparatus as claimed in claim 1, wherein the information about the projection plane further comprises a size of the projection plane, and wherein the at least one processor is further configured to:

identify the protrusion distance of the projecting part as a first protrusion distance based on the size of the projection plane being a first size, and identify the protrusion distance of the projecting part as a second protrusion distance that is greater than the first protrusion distance based on the size of the projection plane being a second size that is larger than the first size.

3. The apparatus as claimed in claim 1,
wherein the at least one processor is further configured to:
identify the protrusion distance of the projecting part as a first protrusion distance based on the distance between the main body and the projection plane being a first distance, and
identify the protrusion distance of the projecting part as a second protrusion distance that is less than the first protrusion distance based on the distance between the main body and the projection plane being a second distance that is greater than the first distance.

4. The apparatus as claimed in claim 1, wherein the at least one processor is further configured to:
protrude the projecting part along a first path based on the protrusion distance of the projecting part being less than a predetermined distance, and
protrude the projecting part along a second path based on the protrusion distance of the projecting part being at least the predetermined distance.

5. The apparatus as claimed in claim 4, wherein the first path is a path along which the projecting part is moved in a direction parallel to a ground on which the electronic apparatus is positioned, and
wherein the second path is a path along which the projecting part is moved in a vertical direction or diagonal direction from the ground on which the electronic apparatus is positioned.

6. The apparatus as claimed in claim 1, wherein the at least one processor is further configured to identify the protrusion distance of the projecting part based on an operation mode of the electronic apparatus and the information about the projection plane.

7. The apparatus as claimed in claim 6, wherein the operation mode is one of:
a first mode in which the projecting part is retracted in the main body,
a second mode in which the projecting part is protruded by a first protrusion distance and displays information on a portion of the projection plane, and
a third mode in which the projecting part is protruded by a second protrusion distance that is greater than the first protrusion distance and projects content on the projection plane.

8. The apparatus as claimed in claim 1, further comprising a screen rotatable at the top of the main body,
wherein the at least one processor is further configured to control the projecting part to:
rotate the screen based on an operation mode of the electronic apparatus being a mode for projecting content on the projection plane, and
project information on the screen while projecting the content on the projection plane.

9. The apparatus as claimed in claim 1, wherein the information about the projection plane further comprises a size of the projection plane.

10. The apparatus as claimed in claim 1, wherein the at least one processor is further configured to:
identify a luminance value corresponding to the protrusion distance of the projecting part, and
control the projecting part to project the image on the projection plane based on the identified luminance value.

11. The apparatus as claimed in claim 1, wherein the at least one processor is further configured to protrude a projecting part included in a second electronic apparatus by a distance corresponding to an event, based on the event occurring while projecting the image on the projection plane in linkage with the second electronic apparatus.

12. The apparatus as claimed in claim 1, wherein the at least one processor is further configured to control the projecting part to display a hologram at a top of the main body based on an operation mode of the electronic apparatus being a first mode in which the projecting part is retracted in the main body.

13. A method for controlling an electronic apparatus that includes a main body separated from a projection plane by a distance, and a projecting part configured to retract in the main body and protrude from the main body to project an image, the method comprising, in a state in which the main body is separated from the projection plane by the distance:
obtaining information about the projection plane including information about the distance between the main body and the projection plane;
identifying a protrusion distance of a projecting part corresponding to the projection plane based on the information about the distance between the main body and the projection plane;
protruding the projecting part based on the protrusion distance; and
controlling the projecting part to project an image on the projection plane.

14. The method as claimed in claim 13, wherein the information about the projection plane further includes a size of the projection plane, and
the identifying of the protrusion distance of the projecting part comprises:
identifying the protrusion distance of the projecting part as a first protrusion distance based on the size of the projection plane being a first size, and
identifying the protrusion distance of the projecting part as a second protrusion distance that is greater than the first protrusion distance based on the size of the projection plane being a second size that is larger than the first size.

15. A non-transitory computer readable recording medium storing a program that executes a method for controlling an electronic apparatus that includes a main body separated from a projection plane by a distance, and a projecting part configured to retract in the main body and protrude from the main body to project an image, wherein the method comprises, in a state in which the main body is separated from the projection plane by the distance:
obtaining information about the projection plane comprising information about the distance between the main body and the projection plane;
identifying a protrusion distance of a projecting part corresponding to the projection plane based on the information about the distance between the main body and the projection plane;
protruding the projecting part based on the protrusion distance; and
controlling the projecting part to project an image on the projection plane.

* * * * *